March 5, 1946. G. A. G. BEERLI 2,395,799
MACHINE FOR REINFORCEMENT OF FLEXIBLE WEBS
Filed March 15, 1944 25 Sheets-Sheet 1
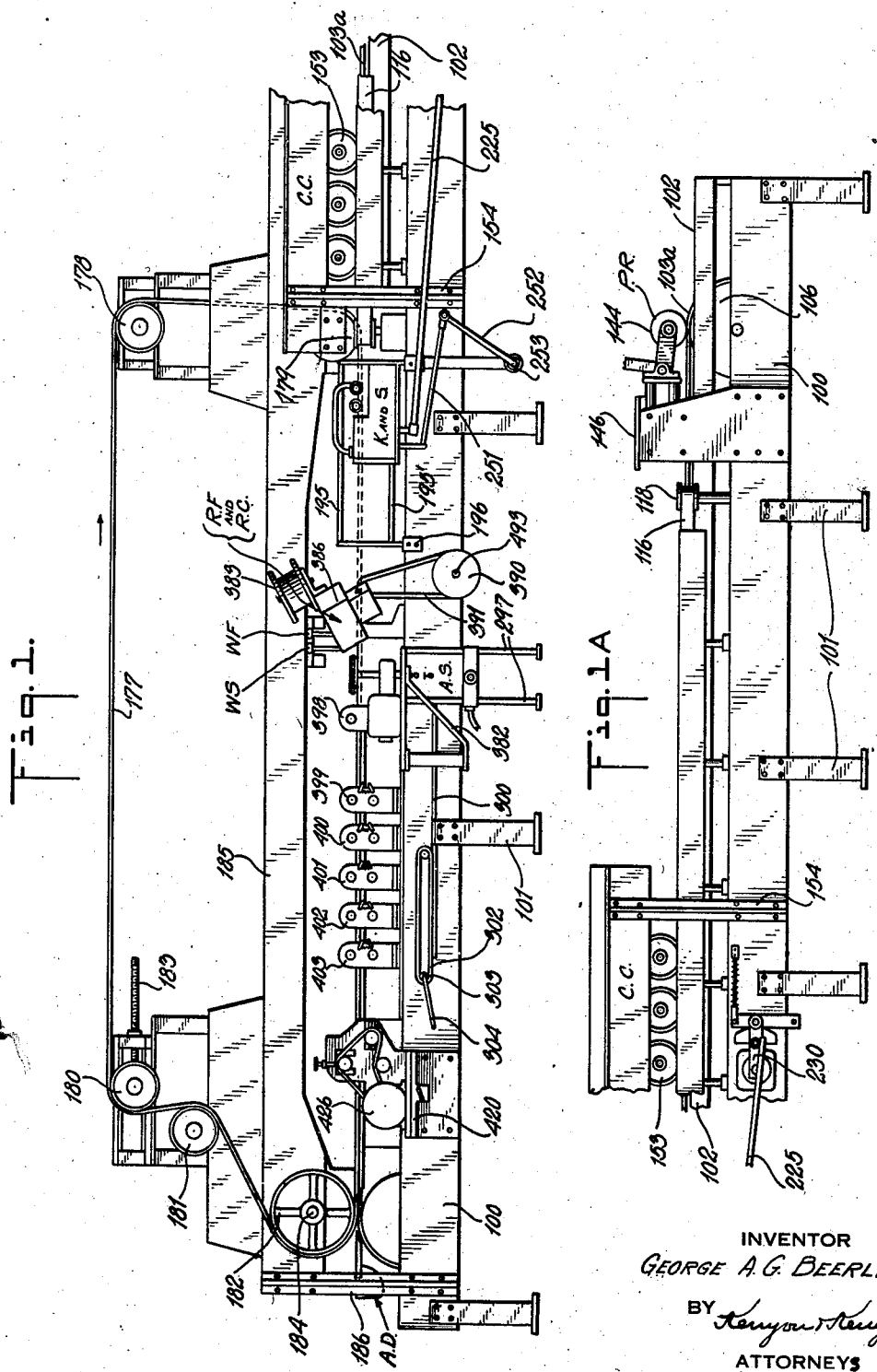
INVENTOR
GEORGE A. G. BEERLI
BY
ATTORNEYS

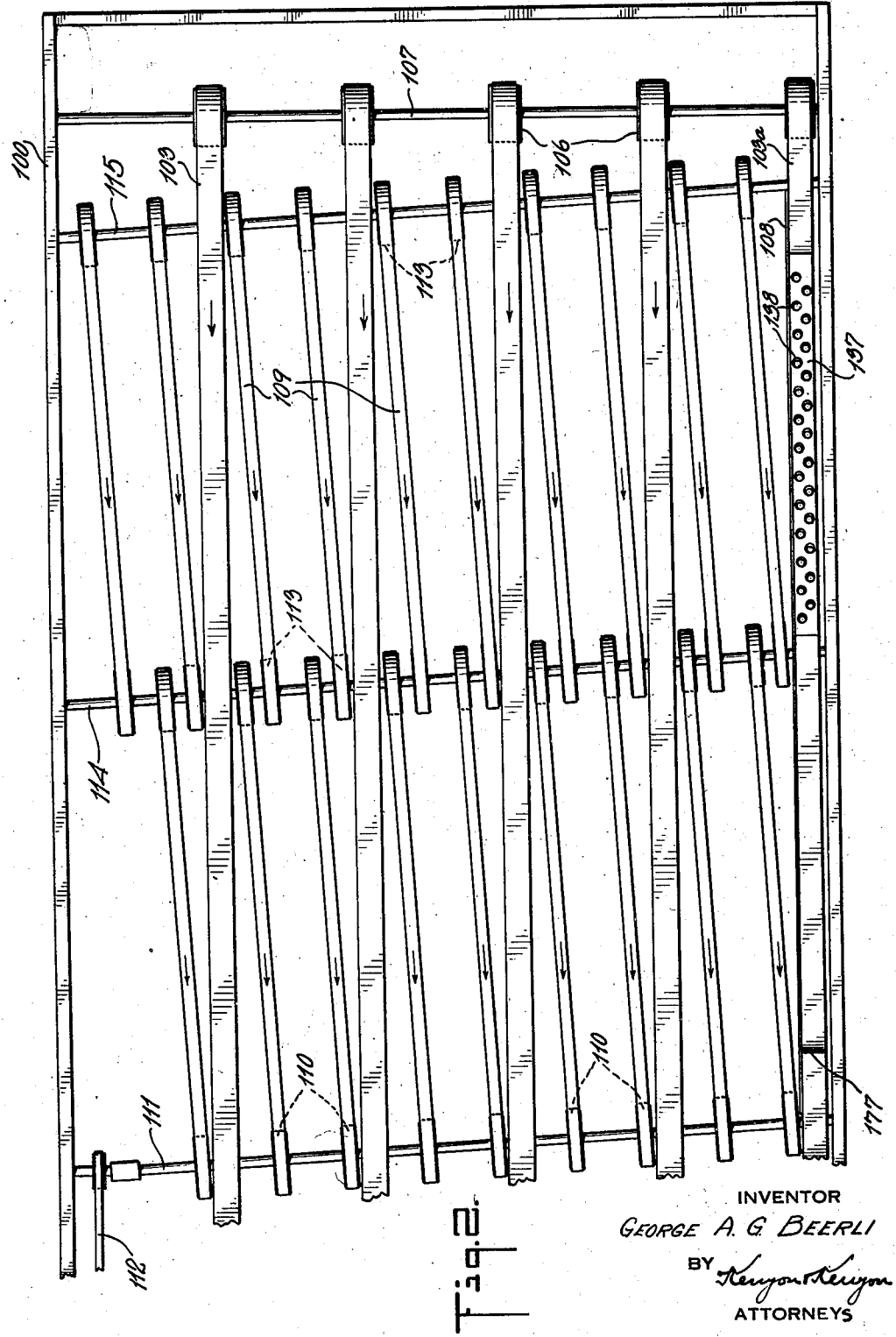

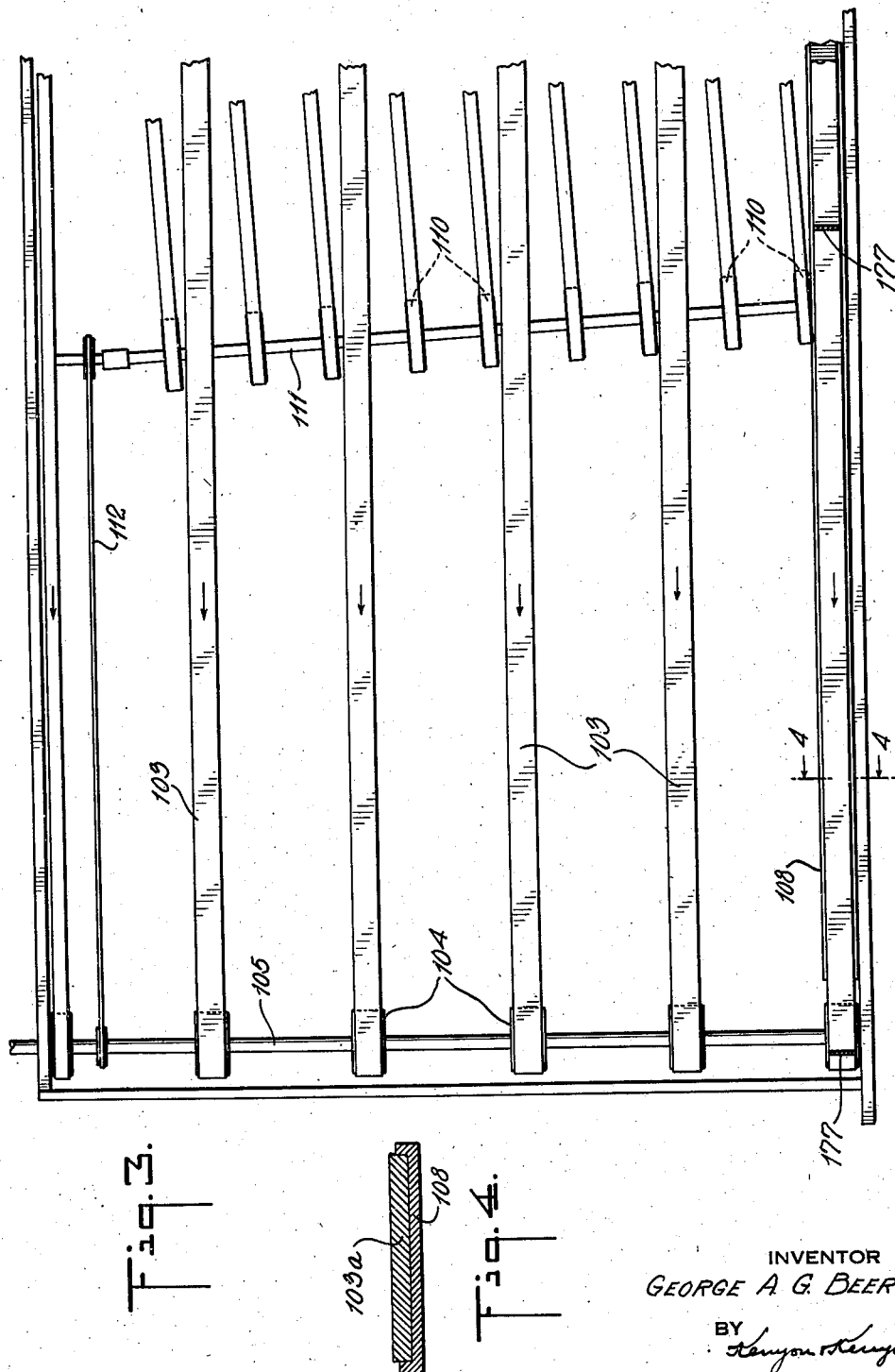

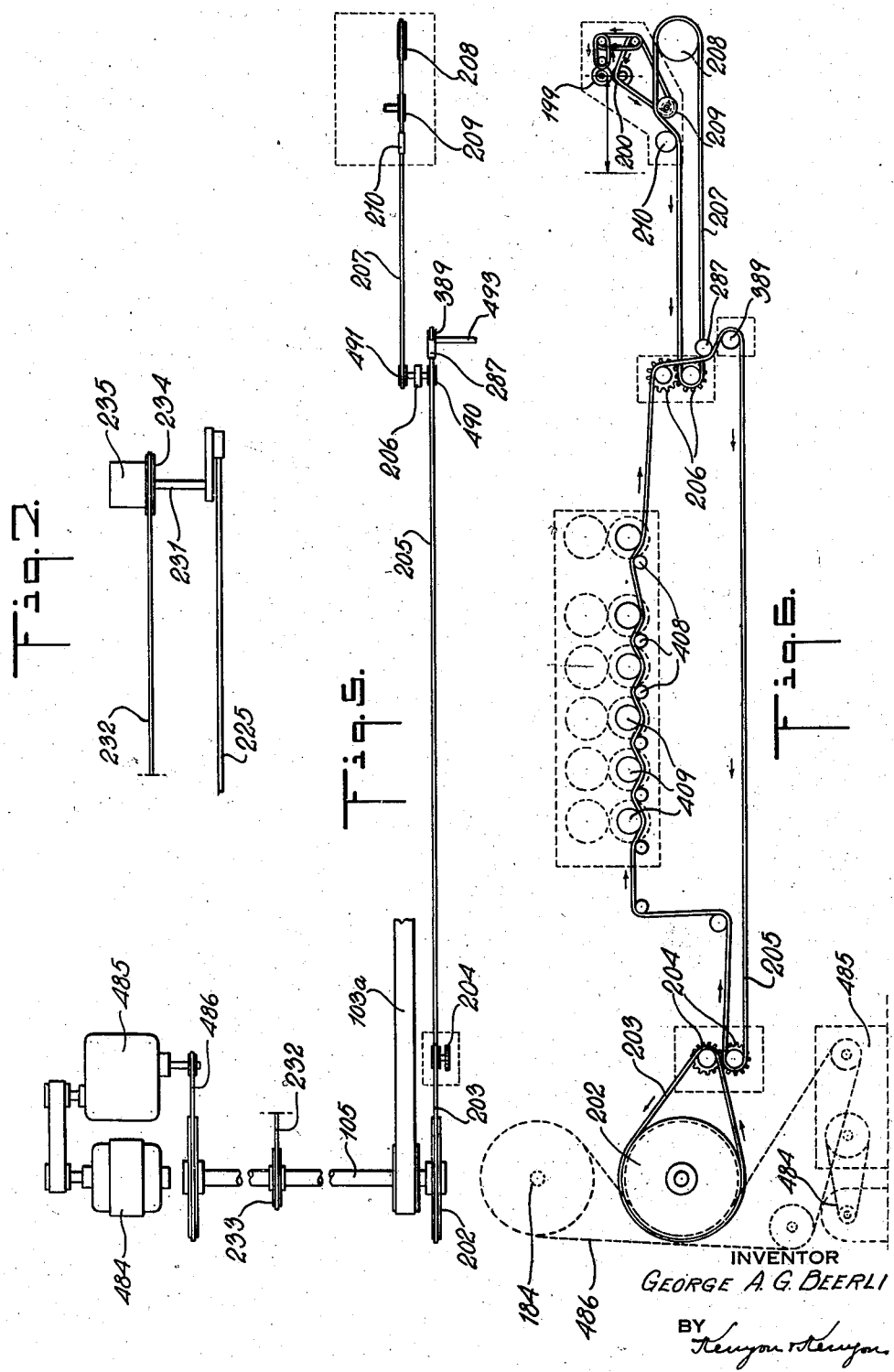

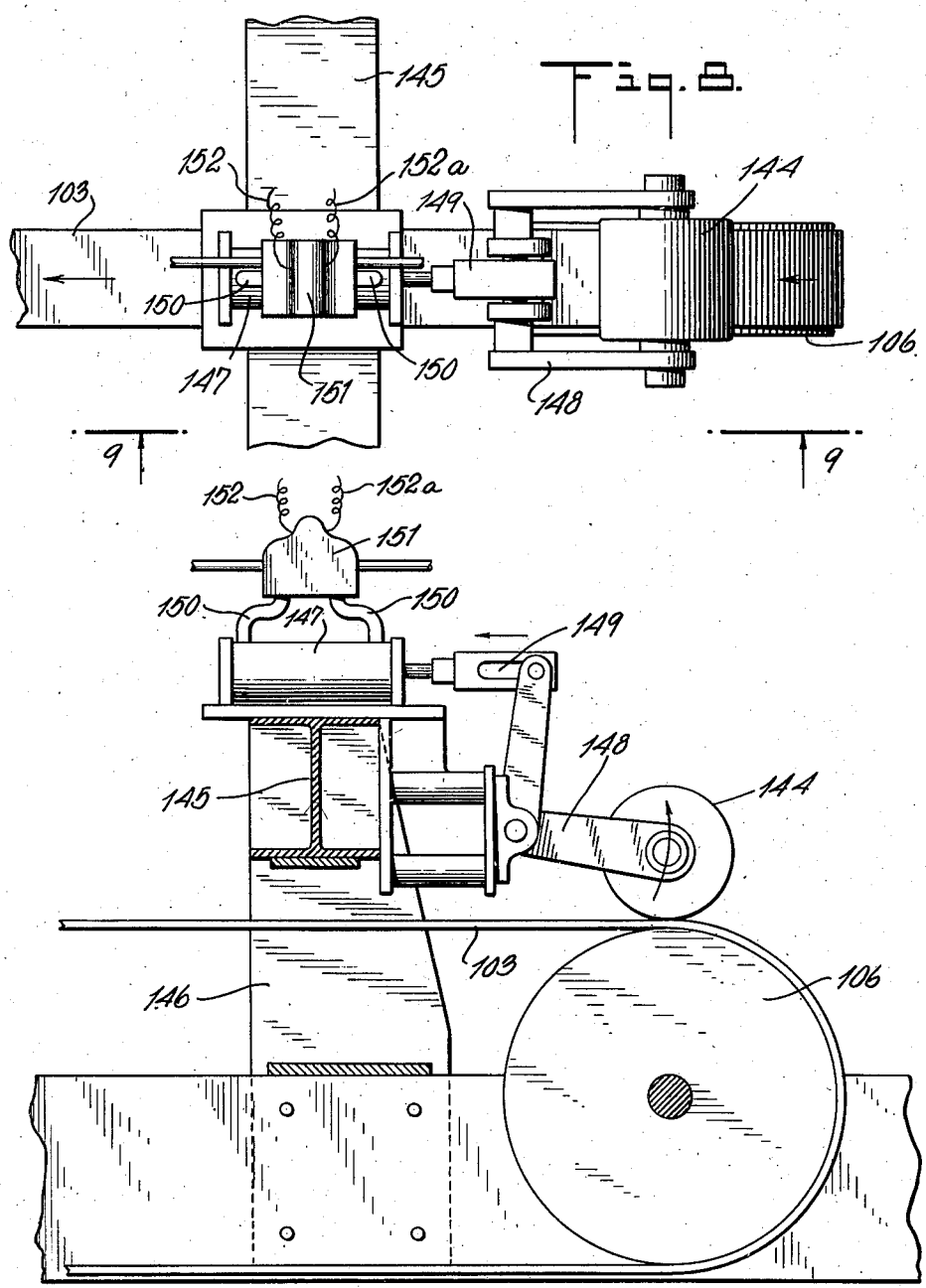

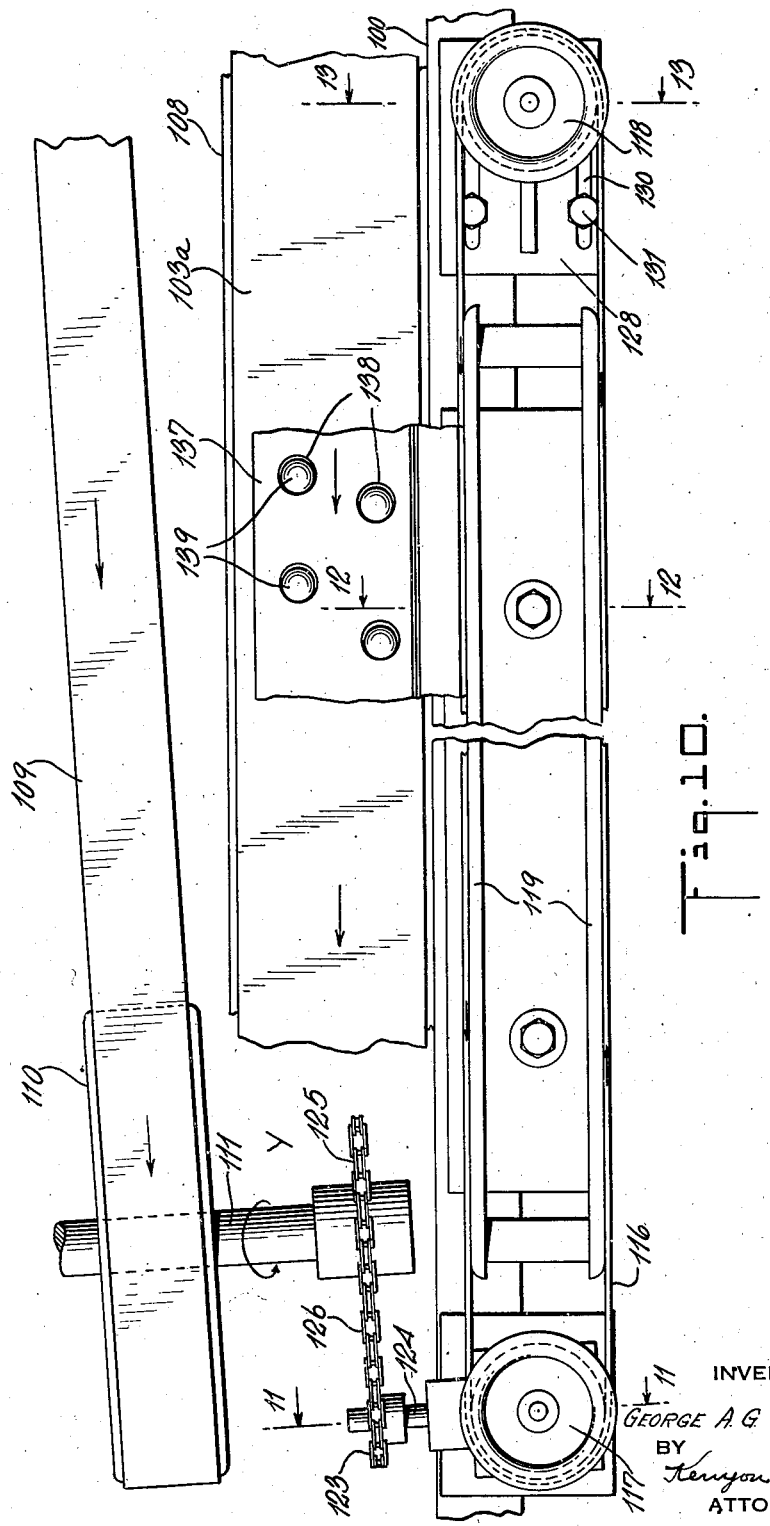

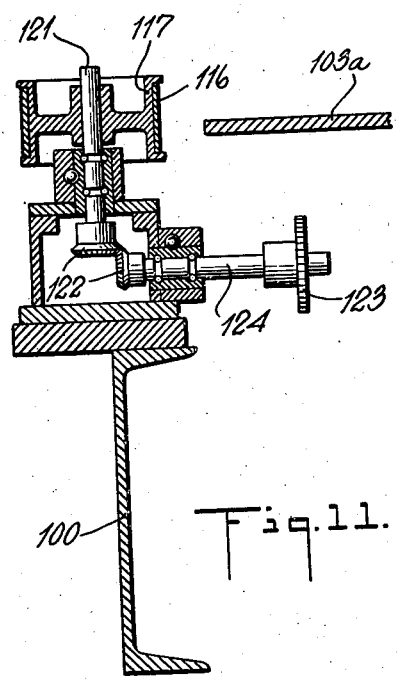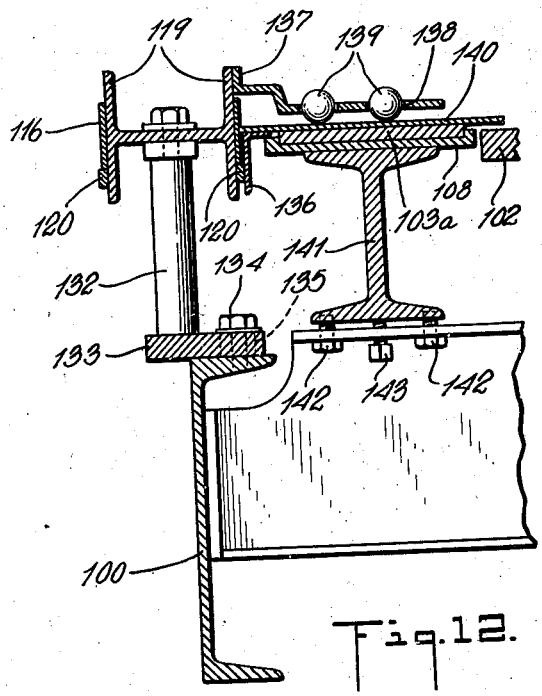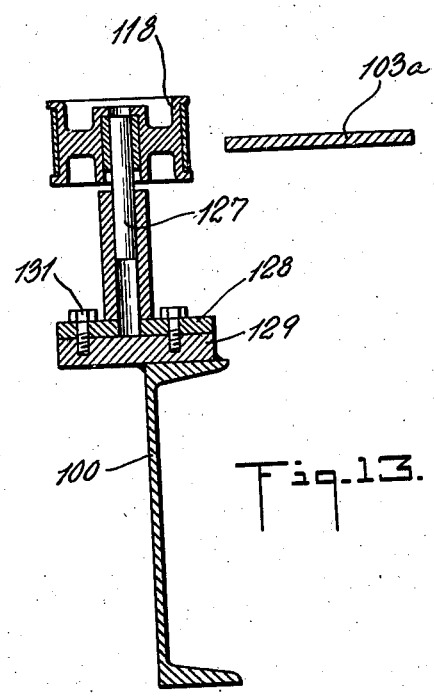

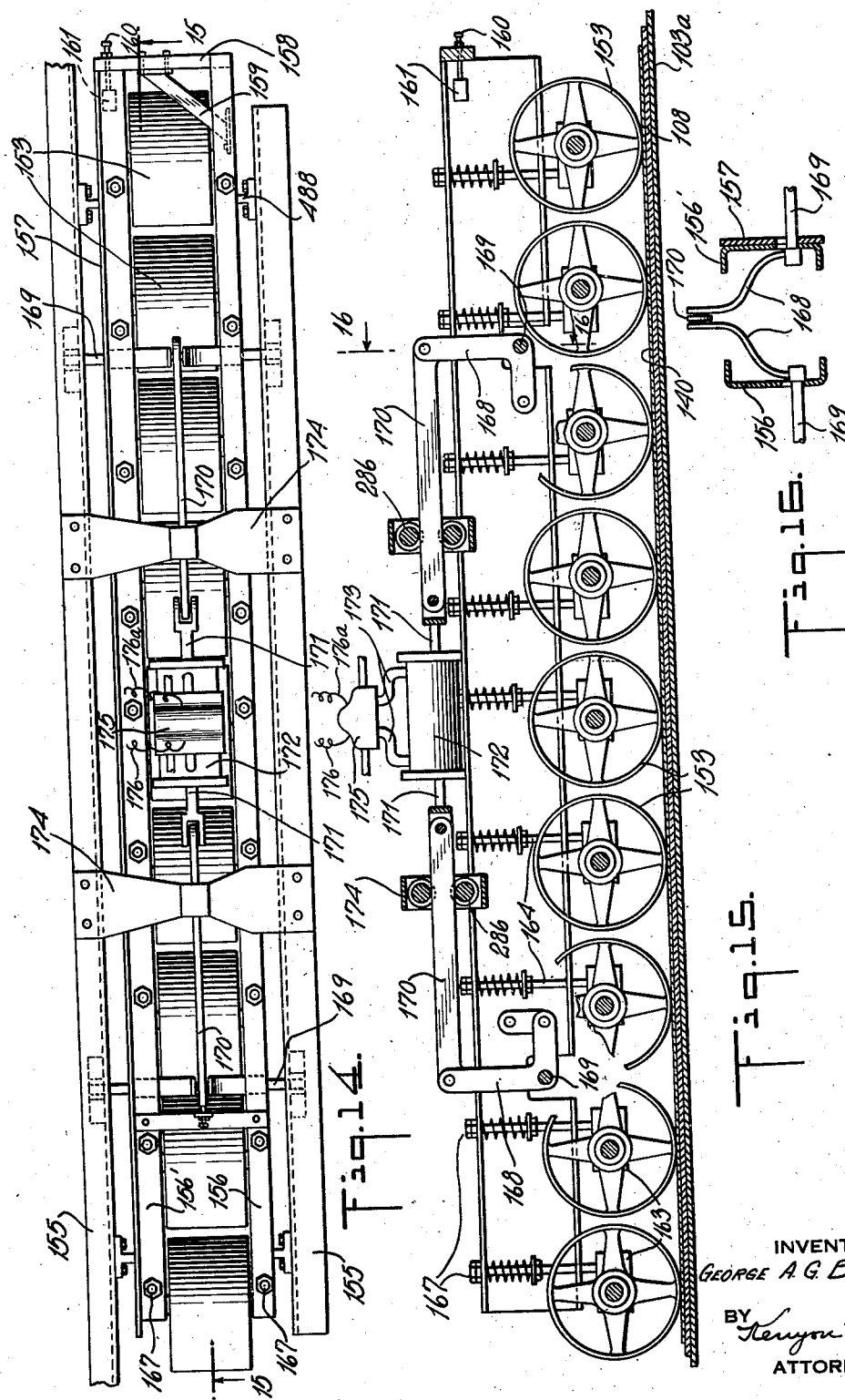

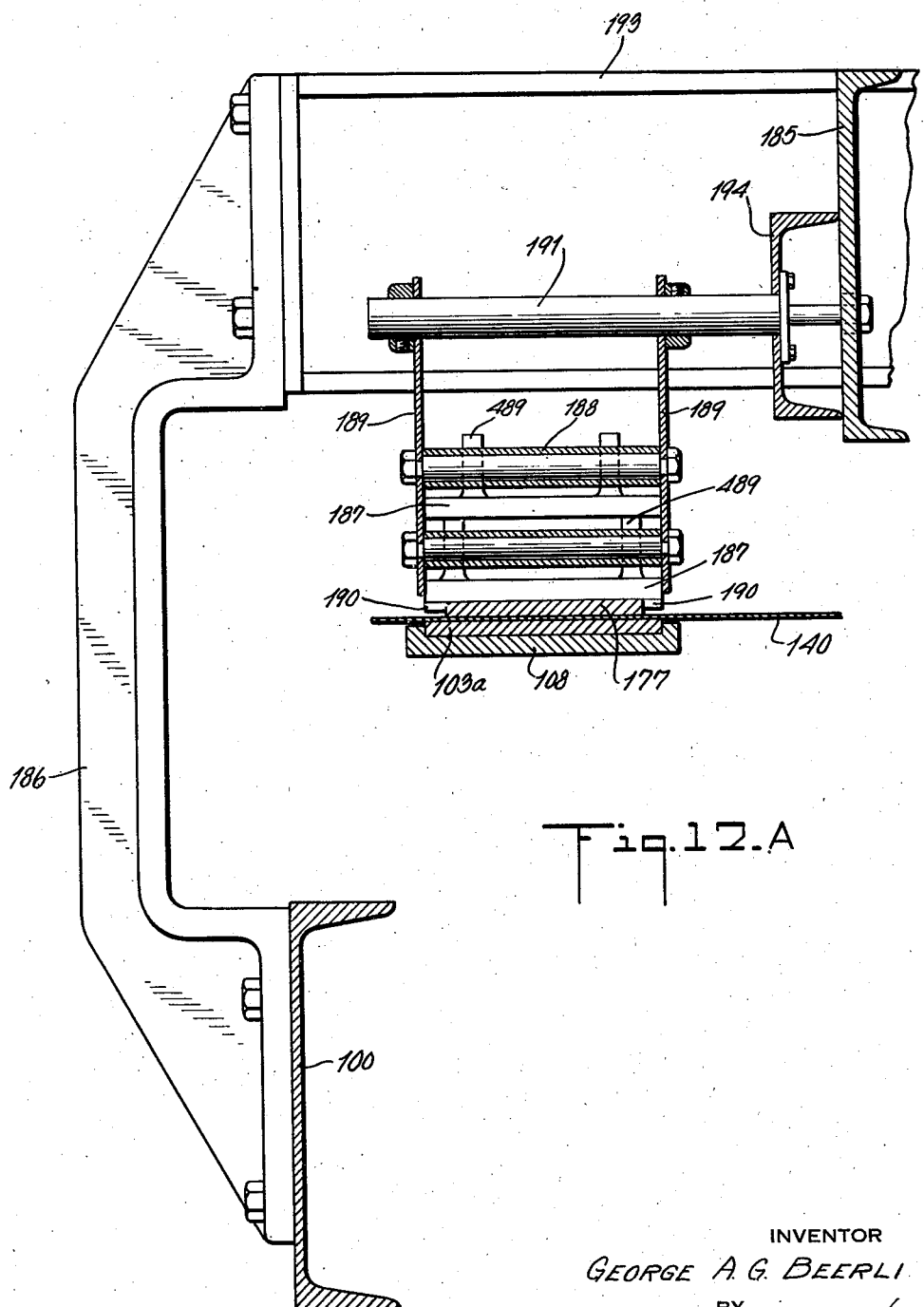

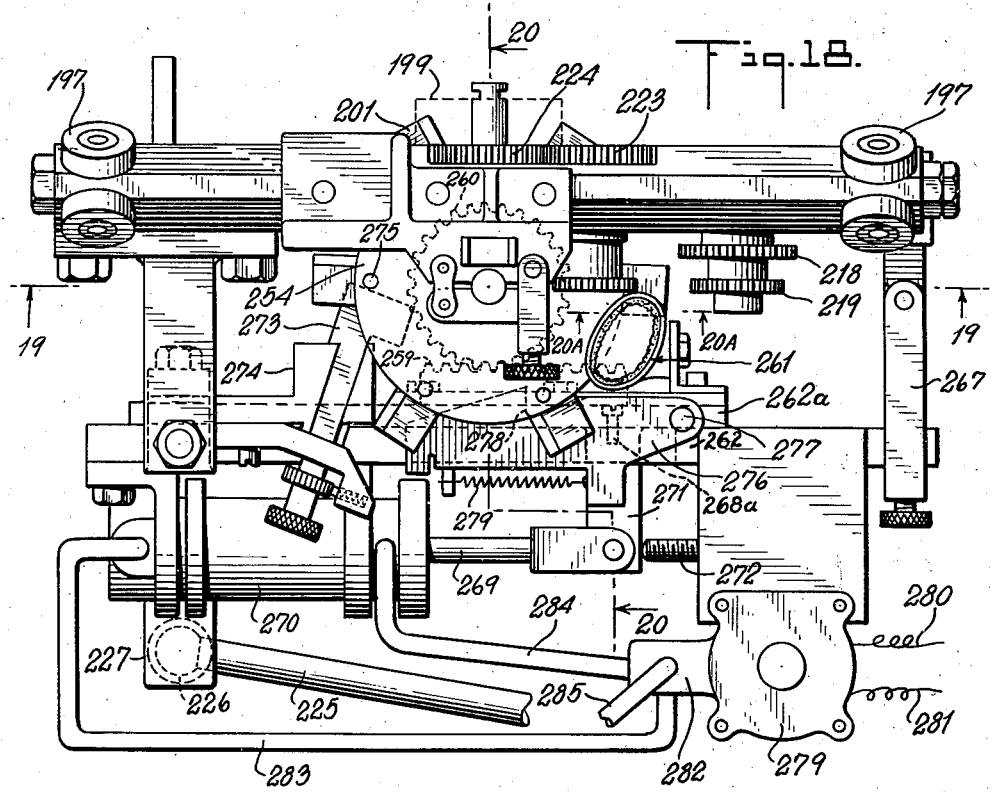
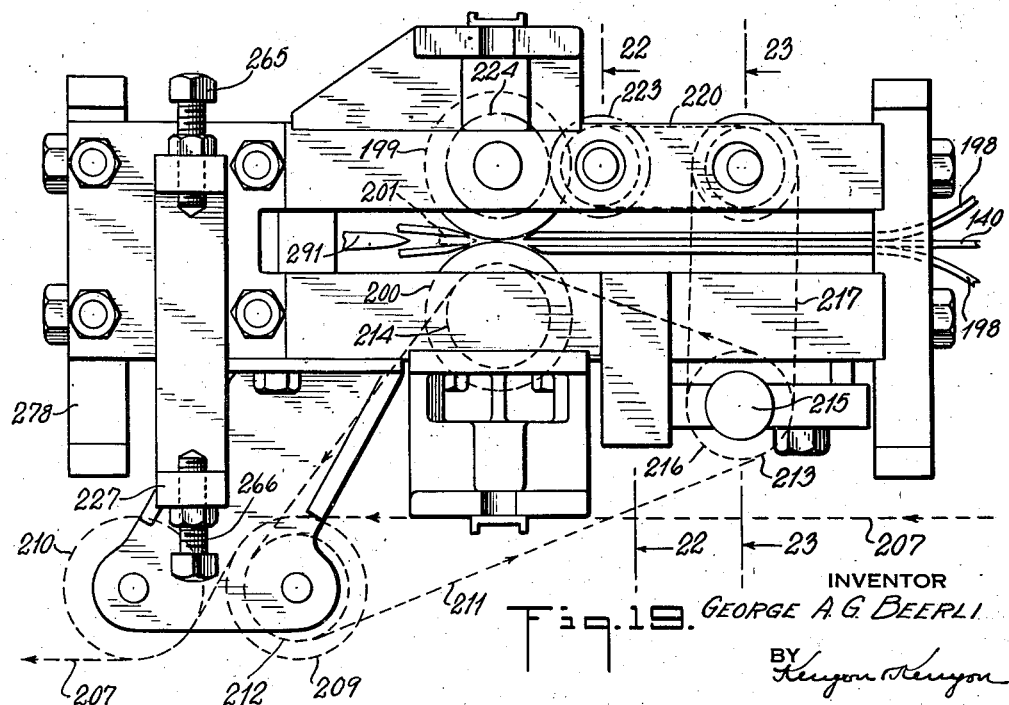

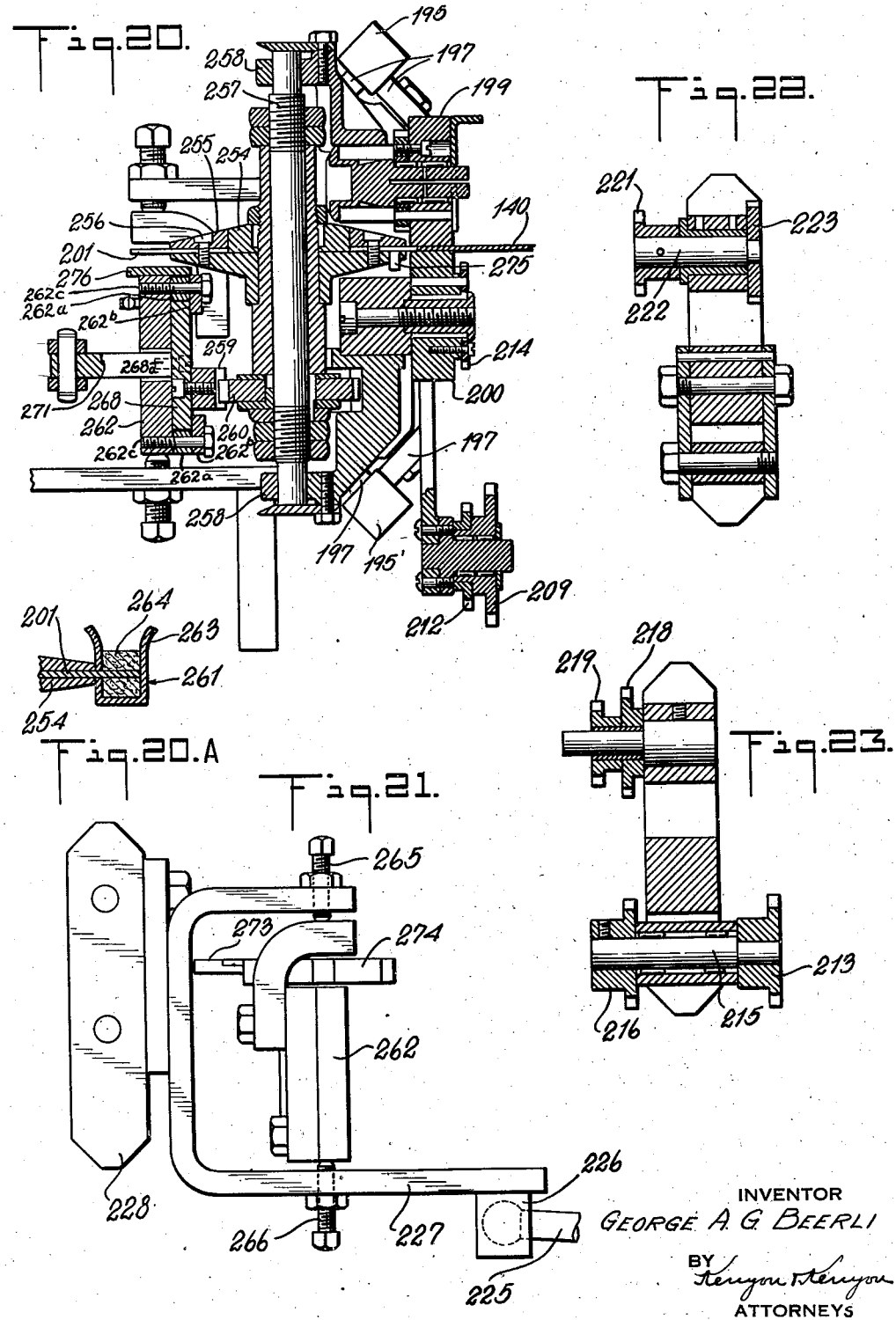

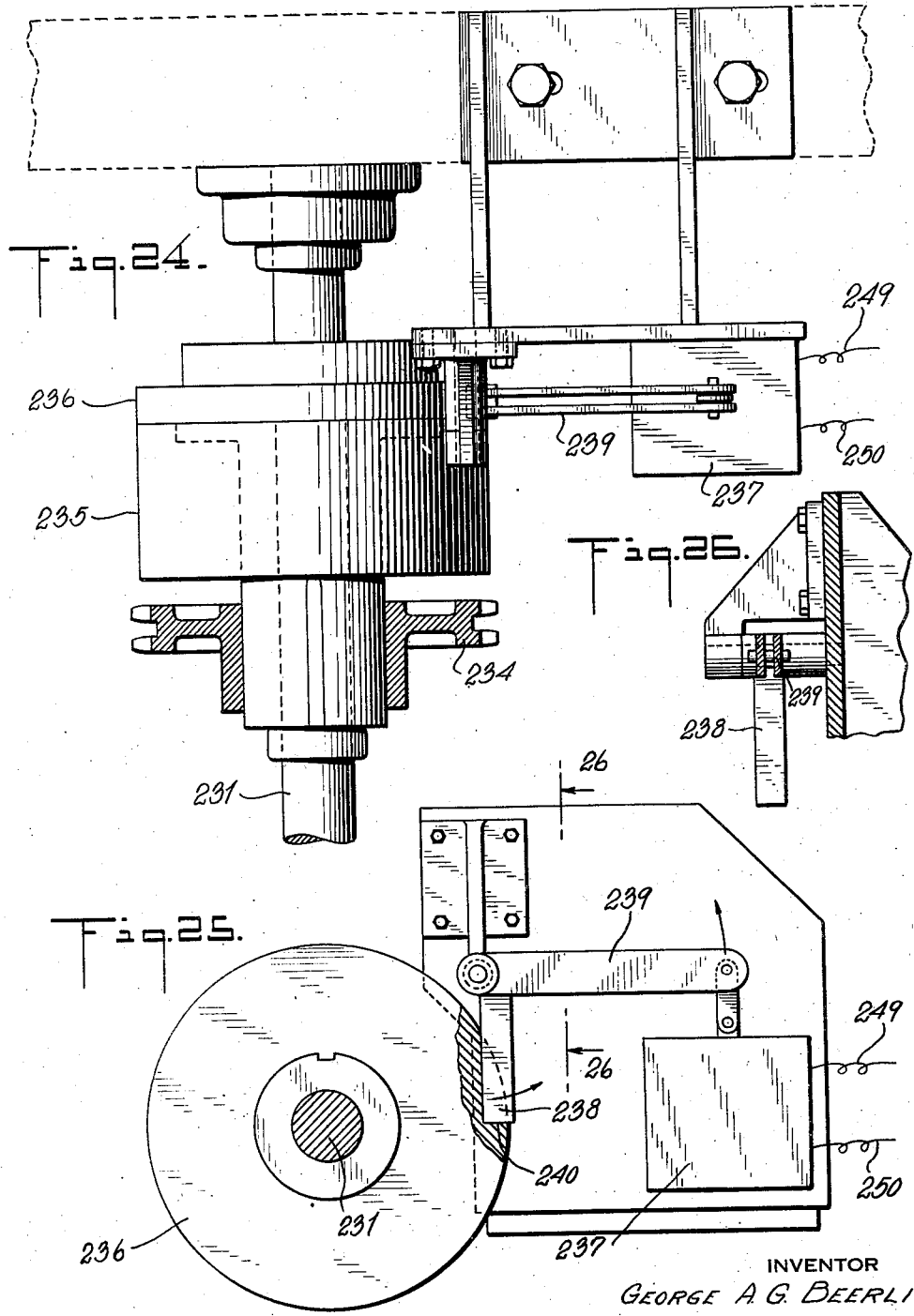

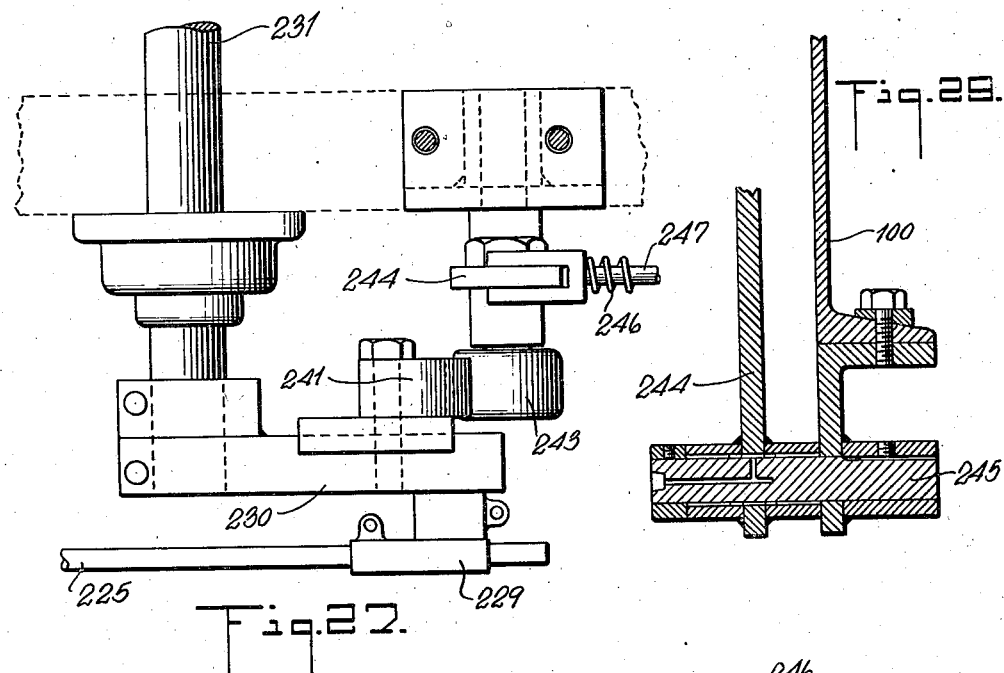
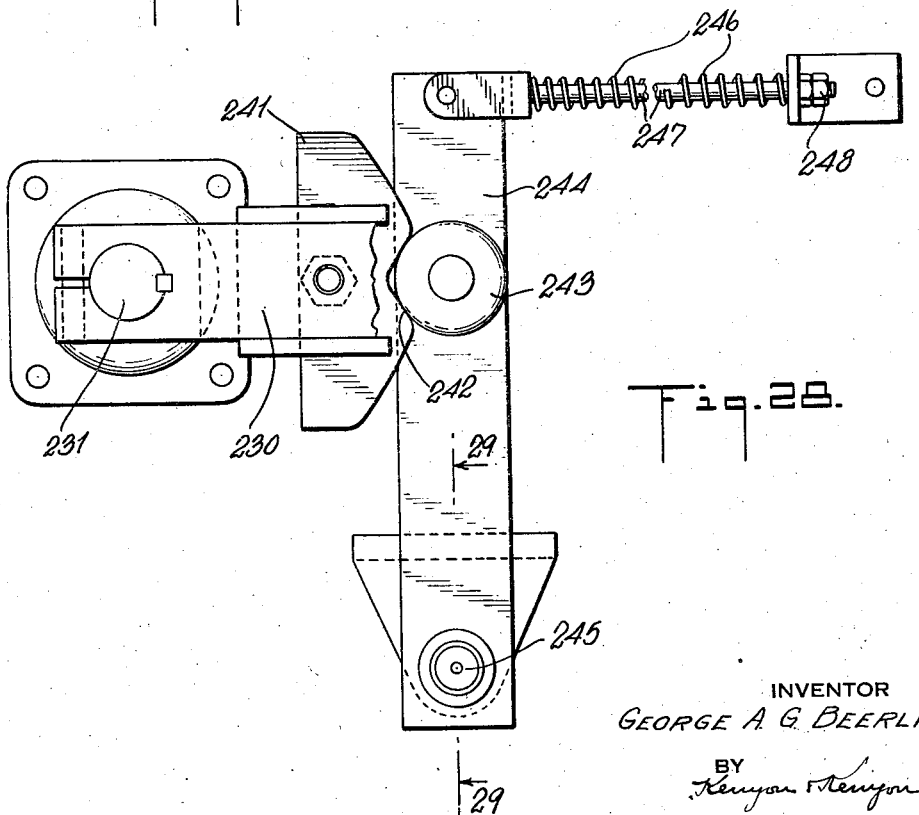

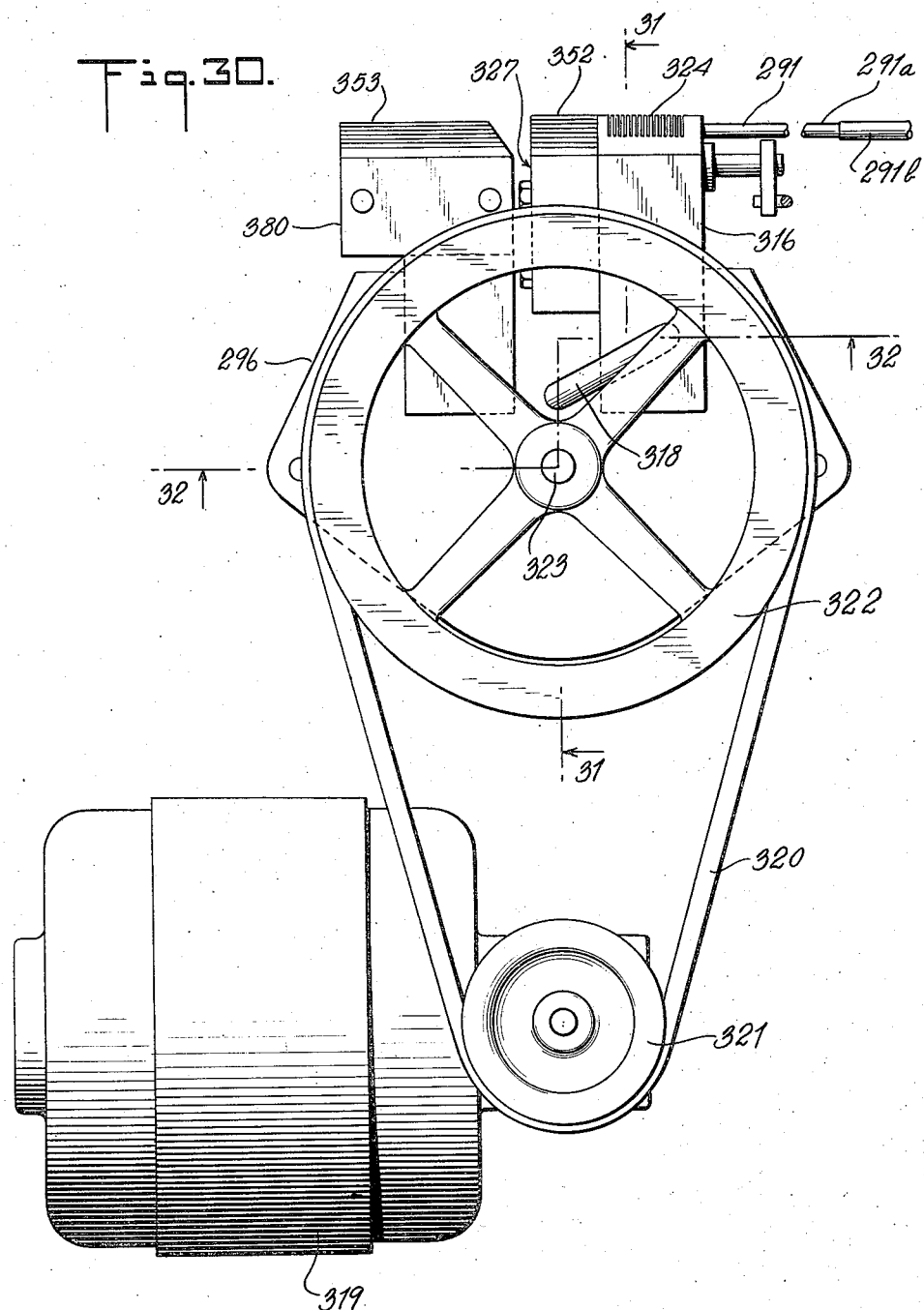

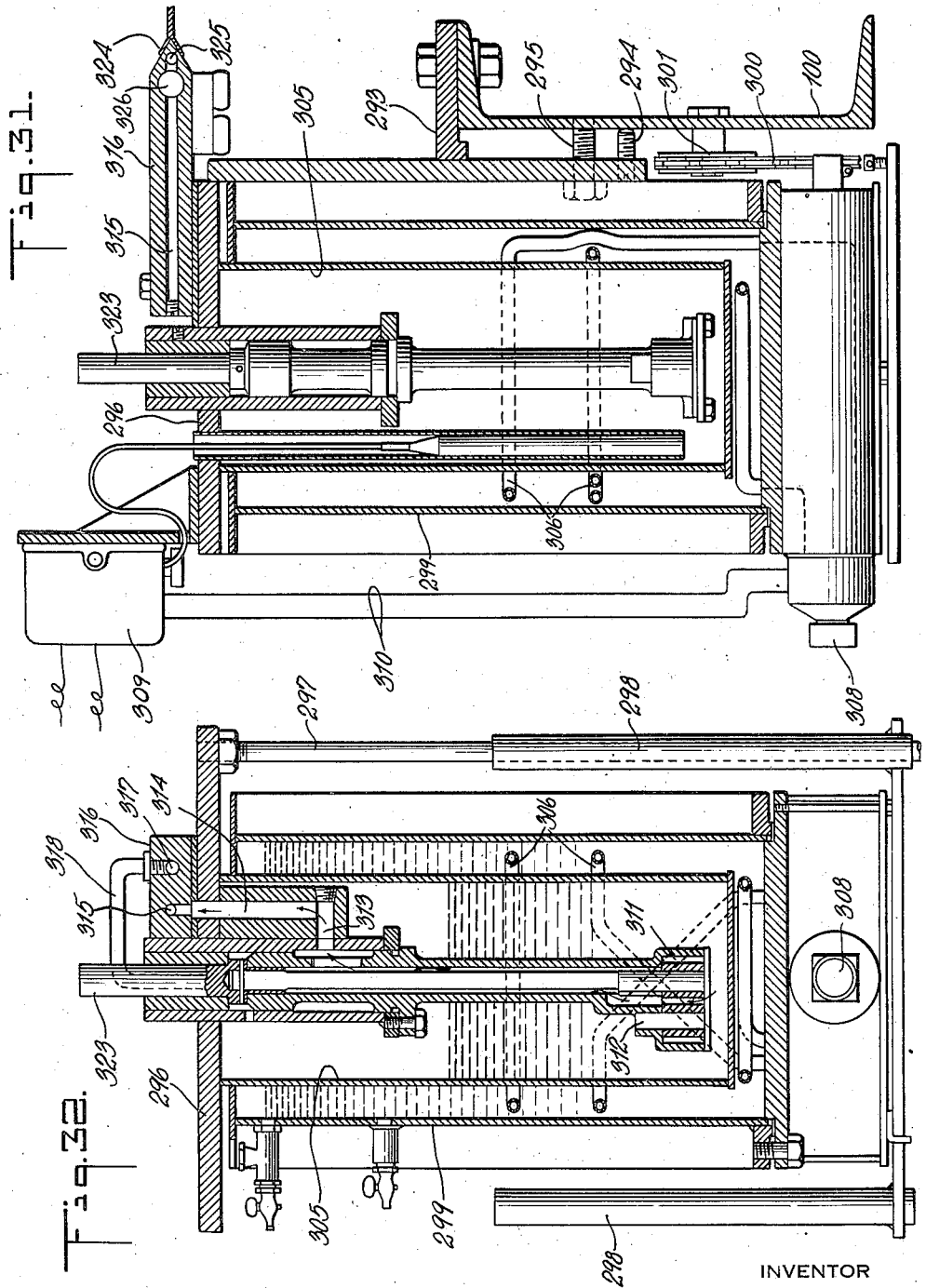

March 5, 1946.   G. A. G. BEERLI   2,395,799
MACHINE FOR REINFORCEMENT OF FLEXIBLE WEBS
Filed March 15, 1944   25 Sheets-Sheet 17

INVENTOR
GEORGE A. G. BEERLI
BY
ATTORNEYS

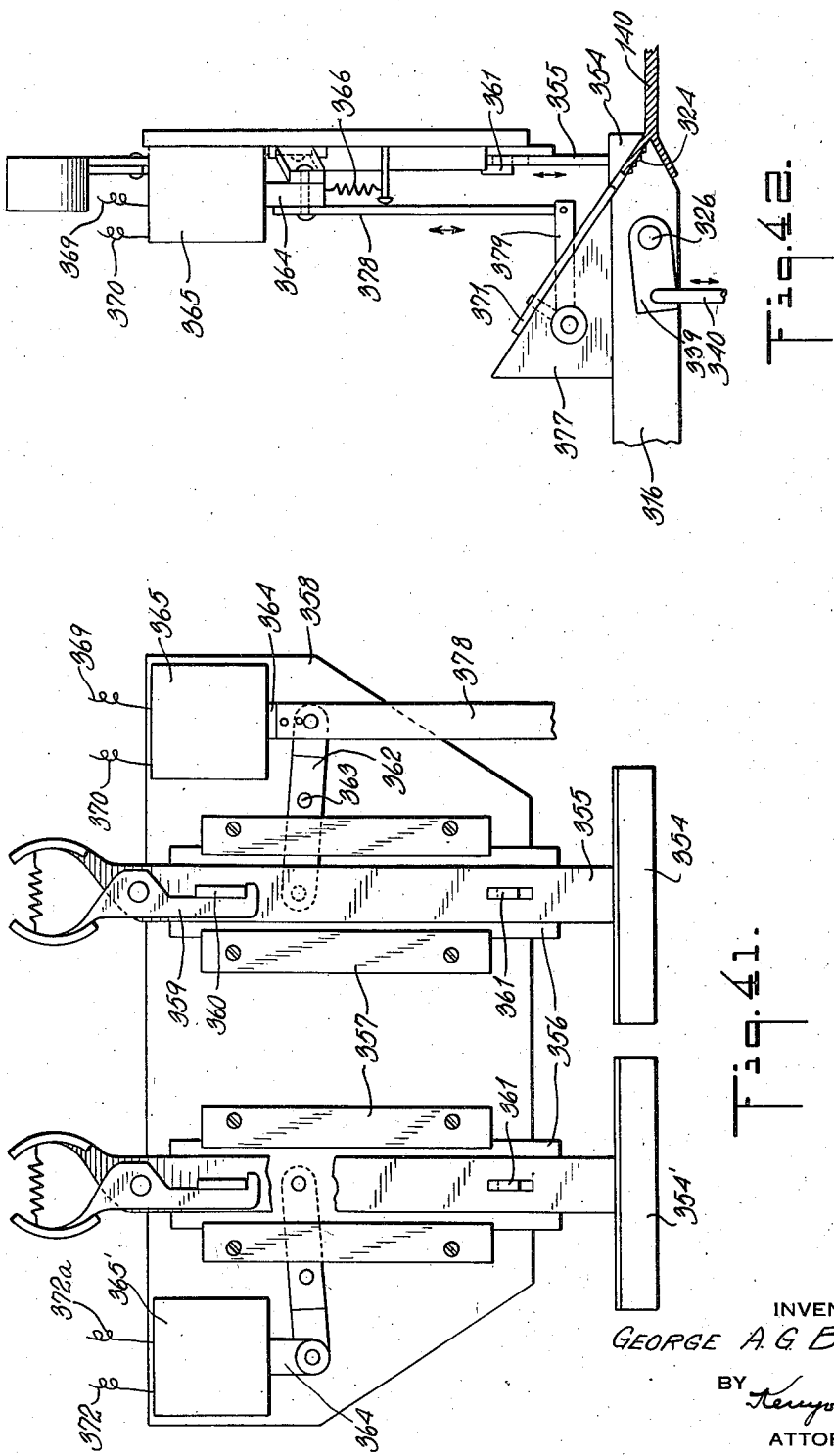

March 5, 1946.  G. A. G. BEERLI  2,395,799
MACHINE FOR REINFORCEMENT OF FLEXIBLE WEBS
Filed March 15, 1944  25 Sheets-Sheet 19
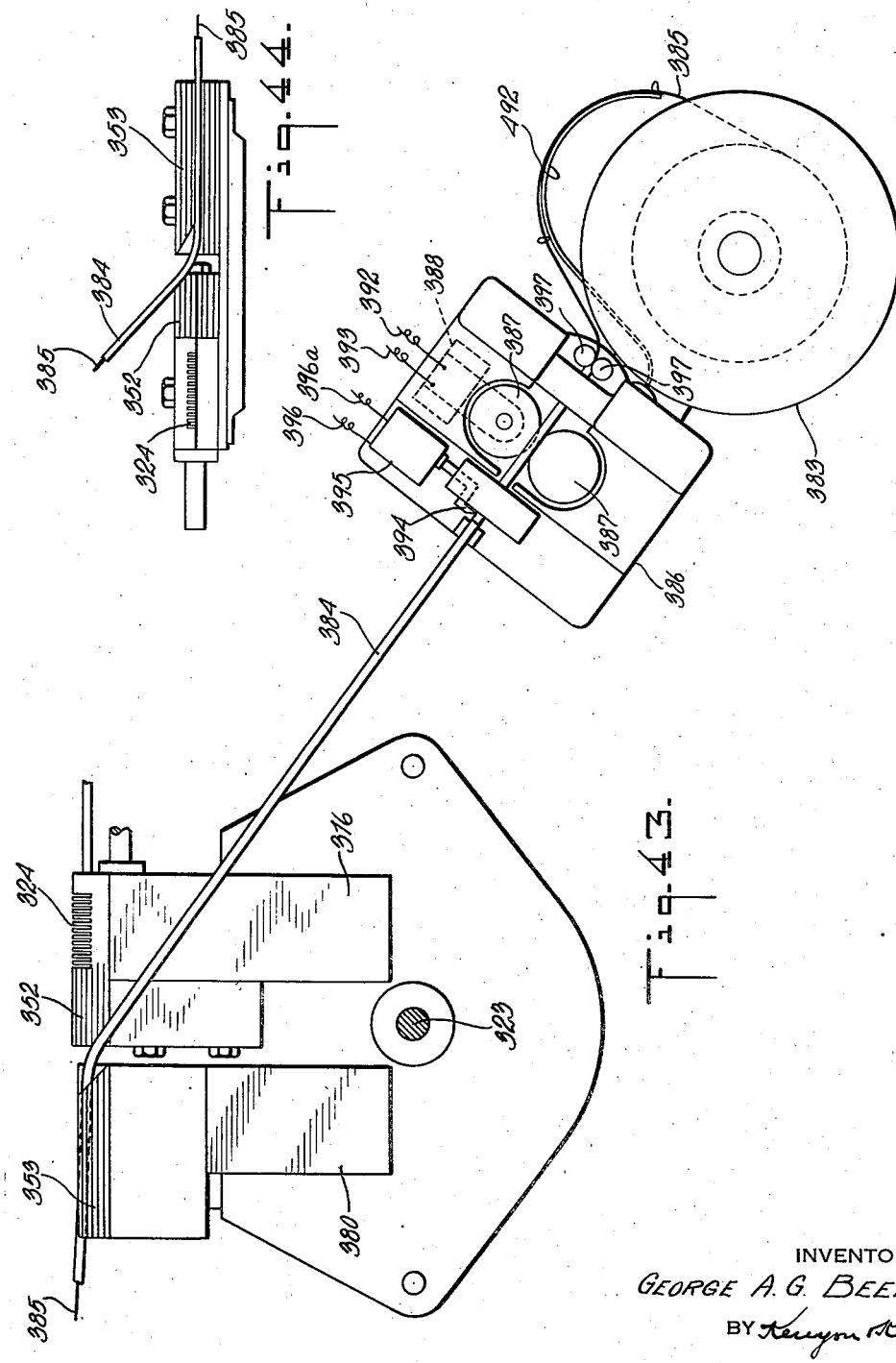
INVENTOR
GEORGE A. G. BEERLI
BY Kenyon & Kenyon
ATTORNEYS March 5, 1946.   G. A. G. BEERLI   2,395,799
MACHINE FOR REINFORCEMENT OF FLEXIBLE WEBS
Filed March 15, 1944   25 Sheets-Sheet 20

INVENTOR
GEORGE A. G. BEERLI
BY
ATTORNEYS

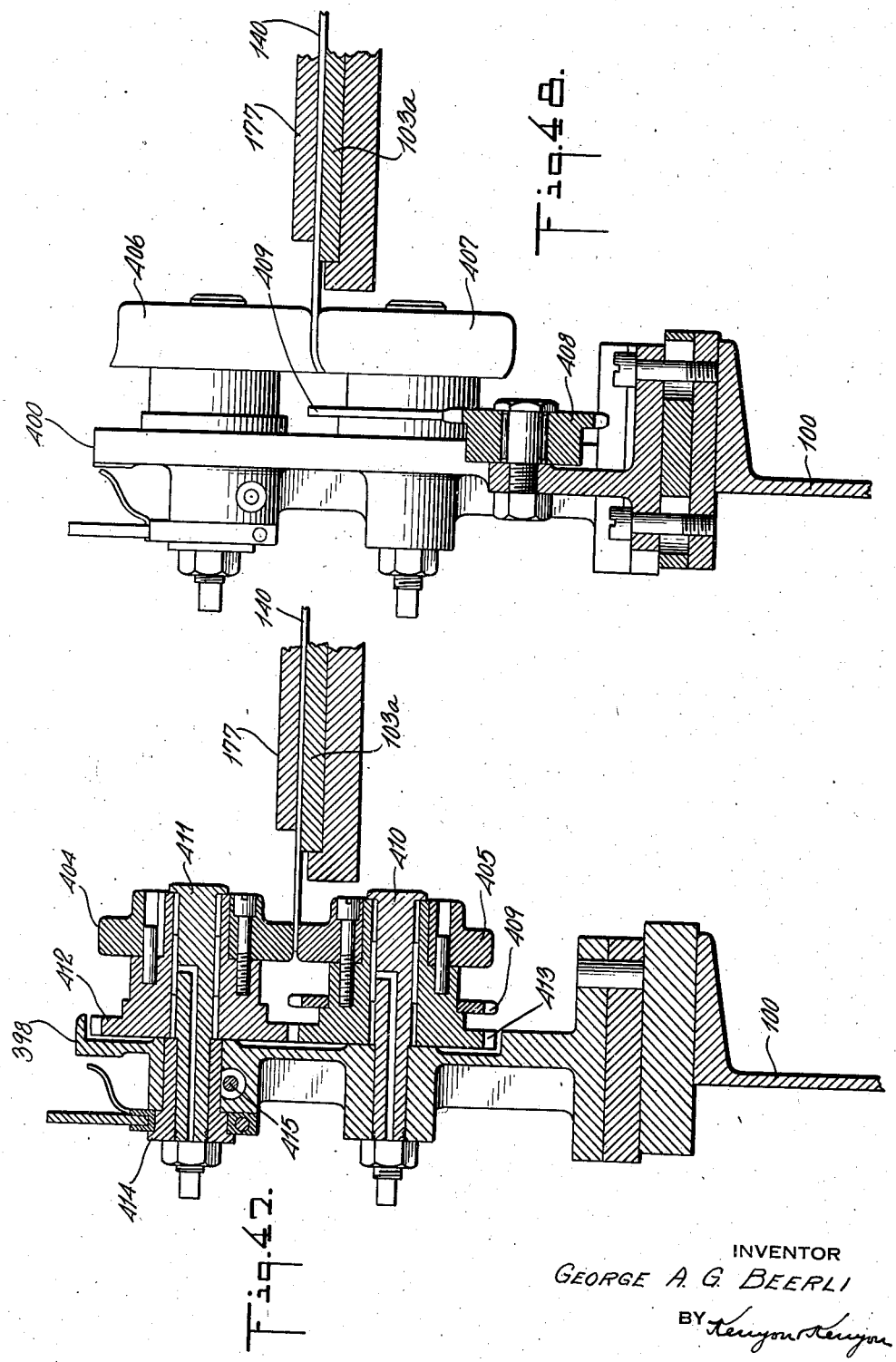

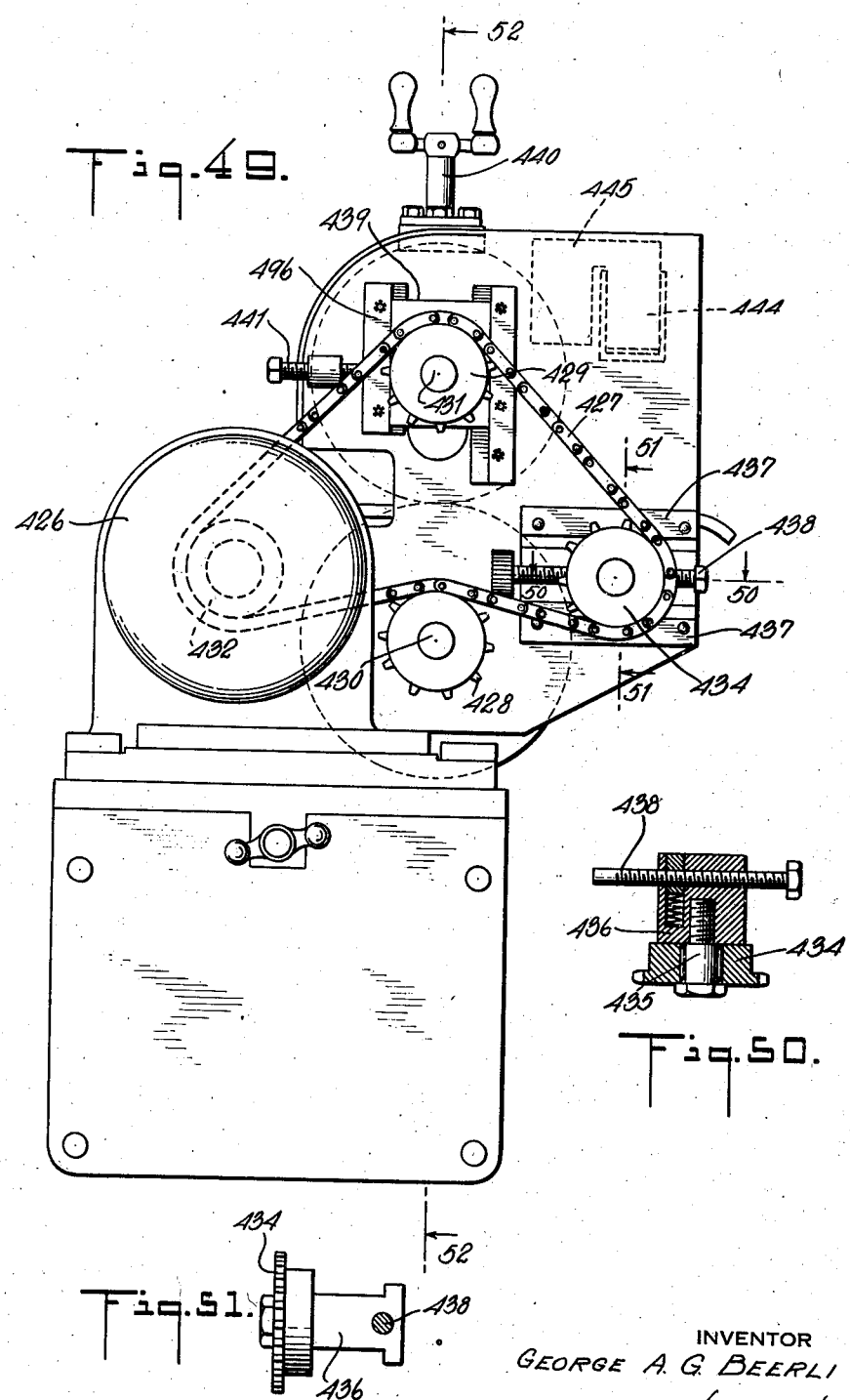

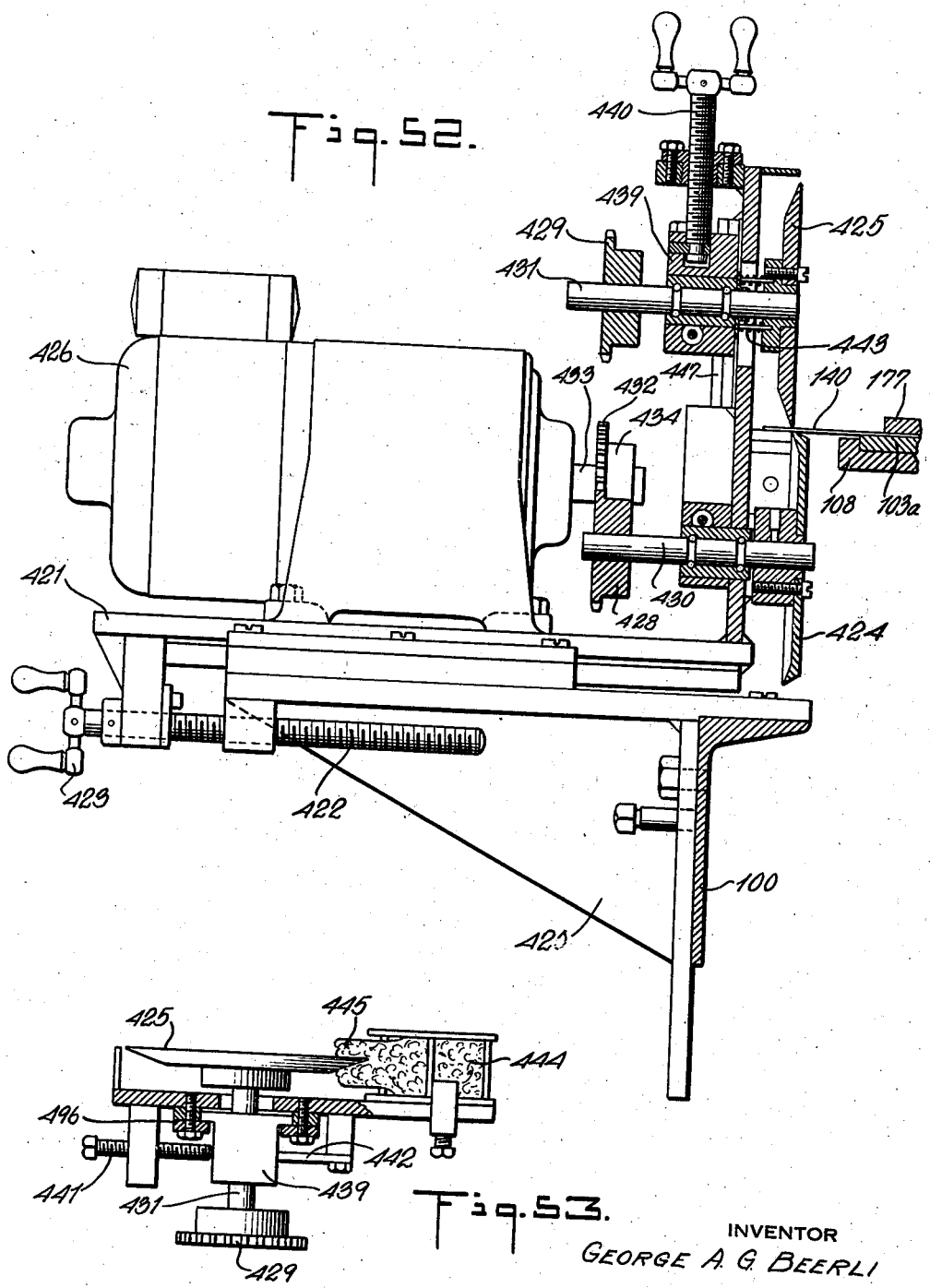

March 5, 1946.  G. A. G. BEERLI  2,395,799
MACHINE FOR REINFORCEMENT OF FLEXIBLE WEBS
Filed March 15, 1944  25 Sheets-Sheet 24

INVENTOR
GEORGE A. G. BEERLI
BY
ATTORNEYS

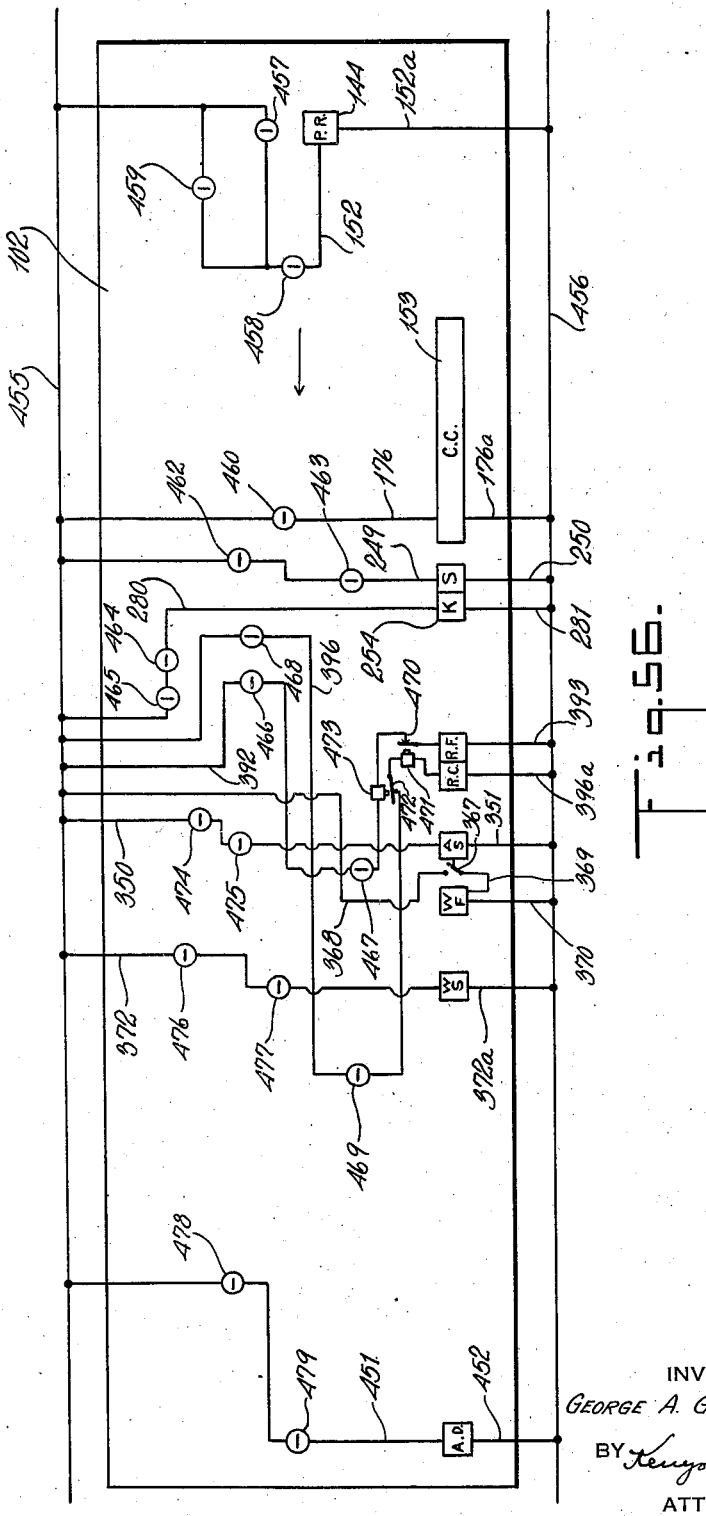

Patented Mar. 5, 1946

2,395,799

UNITED STATES PATENT OFFICE 2,395,799

MACHINE FOR REINFORCEMENT OF FLEXIBLE WEBS

George A. G. Beerli, North Arlington, N. J., assignor to Congoleum-Nairn Inc., a corporation of New York Application March 15, 1944, Serial No. 526,631

45 Claims. (Cl. 154—1)

This invention relates to apparatus for reinforcing sheet material. It relates particularly to apparatus for reinforcing the marginal portion of flexible smooth surface rugs or the like.

A type of flexible smooth surface rug which has been extensively manufactured and sold and in connection with the manufacture of which the apparatus of this invention may advantageously be employed, includes a strain-resisting fibrous base sheet and an overlying wear-resisting and decorative layer comprising a suitable binder and a filler which may comprise a suitable pigment. The strain-resisting base sheet usually consists of a water-laid felt of some suitable fiber such as rag or wood fiber or the like impregnated with a suitable material that is adapted to increase the water-resistance and strain-resistance of the felt, such as a bituminous saturant having a softening point of about 160° F. The wear-resistant and decorative surface layer usually consists of a suitable drying oil paint or enamel, cellulose ester lacquer, synthetic resin lacquer, or molded composition such as linoleum composition or the like. Usually between the strain-resisting base sheet and the decorative and wear-resisting surface layer, a sealing coat is applied which is adapted to resist bleeding of the saturant in the base sheet into the surface layer and which may, for example, comprise a suitable vehicle such as a drying oil or resin, or both, together with a filler. The back of the rug is usually treated with some suitable protective composition such as the composition used for the sealing coat in order to render the back of the rug non-sticky and more attractive in appearance. While the surface of the rug is referred to as "smooth," the term "smooth surface" is used to distinguish from rugs of woven or pile fabrics, for example, and may include rugs having a surface layer of coating or molded composition which contains irregularities in the surface.

In Patent No. 2,184,970 and Patent No. 2,224,209, both issued to Frank M. Allen, there are described flexible smooth surface rugs and the like having embedded in the fibrous base sheet of the rug adjacent the margin thereof an elongated reinforcing element such as a wire. The elongated reinforcing element is embedded in an elongated recess penetrating a substantial distance laterally into the base sheet adjacent an edge thereof. It is an object of this invention to provide a machine whereby flexible smooth surfaced rugs of the character described in said patents to Frank M. Allen and having an elongated reinforcing element embedded therein adjacent the margin may be manufactured economically and in large volume, although the machine of this invention is adapted for the commercial production of reinforced sheet-like products other than flexible smooth surface rugs.

Features of this invention relates to the machine as a whole which constitutes a combination of mechanisms and mechanical means for accomplishing the aforesaid purposes of this invention. Other features of this invention relate to mechanisms and mechanical means forming part of the combination as a whole and which per se constitute new and useful improvements in apparatus of the character referred to.

Features of this invention have to do particularly with the construction and operation of what are referred to herein as sheet margin or rug margin operational mechanisms including slitting means, adhesive supply means, reinforcement supply means, wiping means, slit closing means, and trimming means, and the combination of all or any of said operational mechanisms with means for supporting, aligning, and holding the sheet material for subjecting the marginal portion thereof to the action of said operational mechanisms, and the combination of any or all of such mechanisms with tripping or actuating mechanisms whereby the operation of the operational mechanisms is controlled by the position of the sheet material relative to the operational mechanisms.

Before describing in detail the machine of this invention in connection with the accompanying drawings, brief reference may be made to some of the principal features and advantages of the machine.

In combination the machine provides means whereby sheet material such as a flexible smooth surface rug may be positively and automatically aligned and then held in properly aligned position for and during the operation of the sheet margin operational mechanisms while providing relative movement between the marginal portion of the sheet material and the sheet margin operational mechanisms. Moreover, the machine provides suitable tripping or actuating means whereby the sheet margin operational mechanisms are caused to function at the proper time and for the proper time interval for the accomplishment of the different operations.

Somewhat more in detail, one of the sheet marginal operational mechanisms is a slitting means which is so combined with the sheet supporting and aligning means as to provide varying relative speeds between the slitting tool and the margin of the sheet material, and which comprises novel knife holding and cleaning mechanisms. The machine also includes novel adhesive supply means, including novel application and ejector mechanisms for cooperating with the slit produced by the slitting means. A novel reinforcement supply means is provided whereby the reinforcement is introduced into and deposited in the slit produced by the slitting means in desired position and of desired length relative to the sheet material handled by the machine. Novel slit closing means cooperates with the reinforcement supply means and closes the slit with the reinforcement embedded in the margin of the slit. Trimming means trims the edge of the sheet material after the reinforcement has been embedded. The machine is provided with novel means for introducing the sheet material and for discharging it after the marginal portion thereof has been reinforced.

Further purposes, features and advantages of this invention will be apparent from the following description of the embodiments of this invention which are shown for purposes of illustration in the accompanying drawings, wherein:

Fig. 1 is a front elevation, partly schematic, of the main portion of the machine including the sheet margin operational mechanisms and the discharge end of the machine;

Fig. 1A is a front elevation, partly schematic, of the receiving end of the machine, Fig. 1A being a continuation of Fig. 1;

Fig. 2 is a plan view of belt support means for supporting and conveying the sheet material adjacent the receiving end of the machine;

Fig. 3 is a plan view similar to Fig. 2 of the belt support means adjacent the discharge end of the machine;

Fig. 4 is a detail sectional view of the marginal belt and belt support means, taken on the line 4—4 of Fig. 3;

Fig. 5 is a plan view, partly schematic, of the principal drive mechanism of the machine;

Fig. 6 is a front elevation of the drive mechanism of Fig. 5;

Fig. 7 is a plan view of the clutch mechanism associated with the drive mechanism for actuating certain movements of the slitting means;

Fig. 8 is a detail plan view of one of the pick-up rolls that cooperates with the carrying belts;

Fig. 9 is a side view of the pick-up roll shown in Fig. 8;

Fig. 10 is a plan view of the edge belt part of the aligning mechanism;

Figure 12:
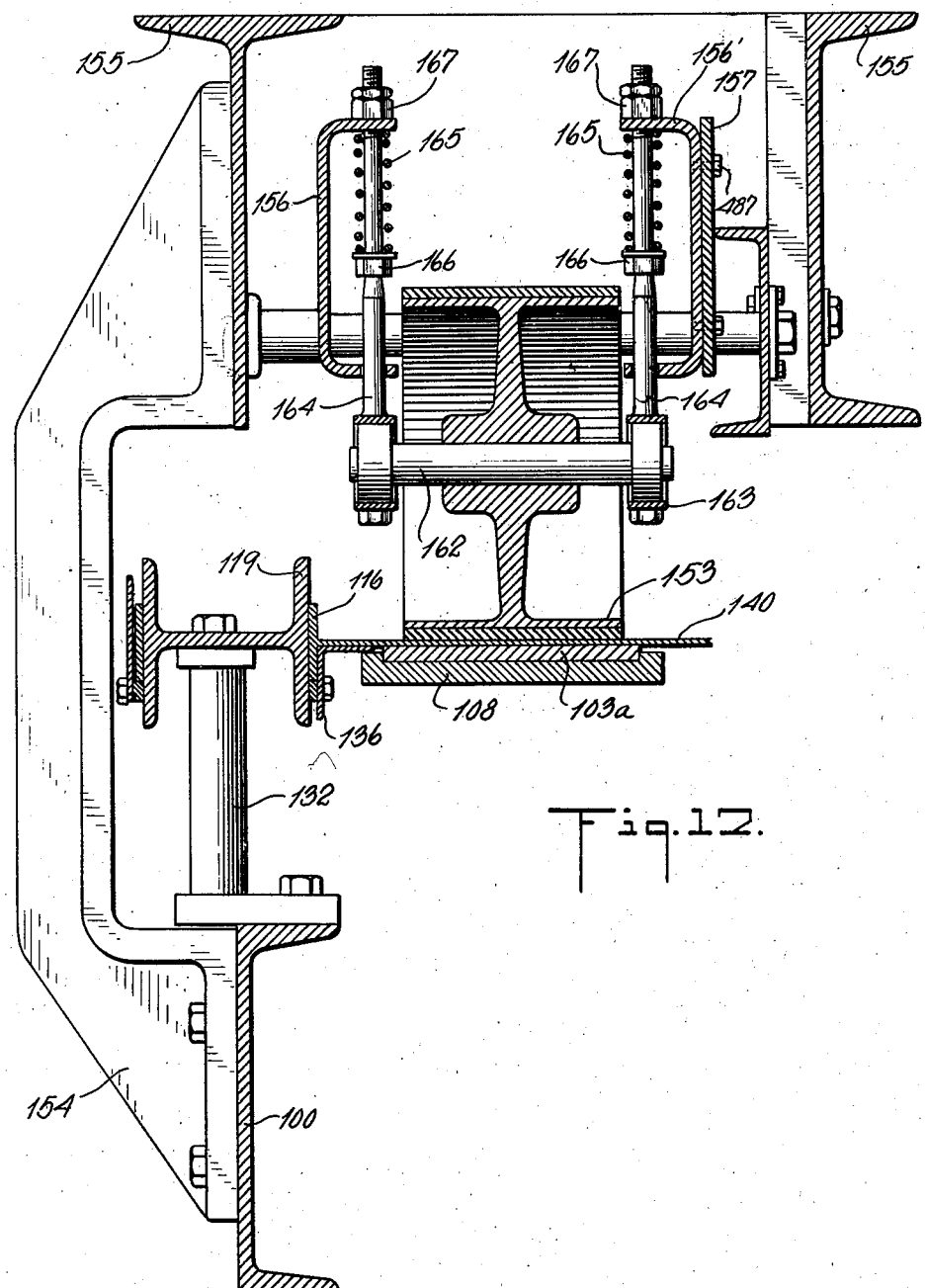
Figure 33:
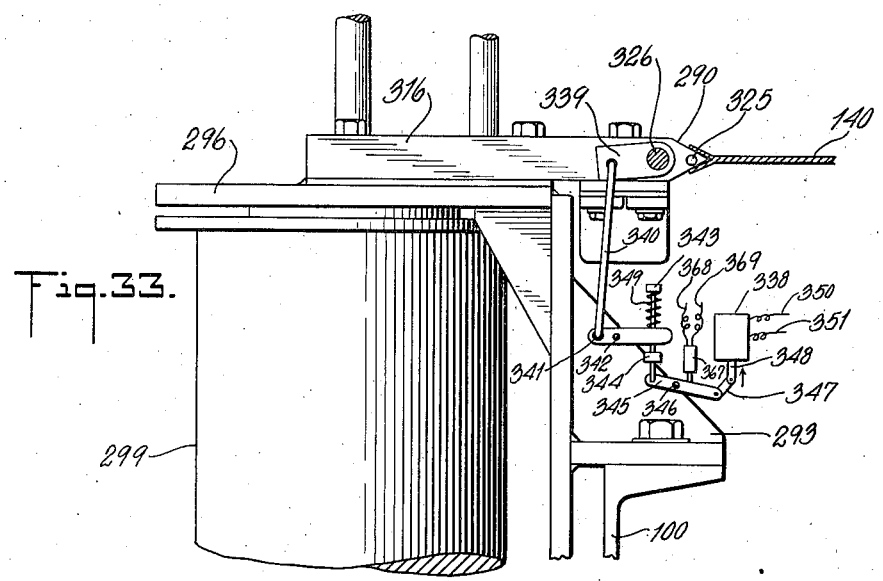
Figure 40:
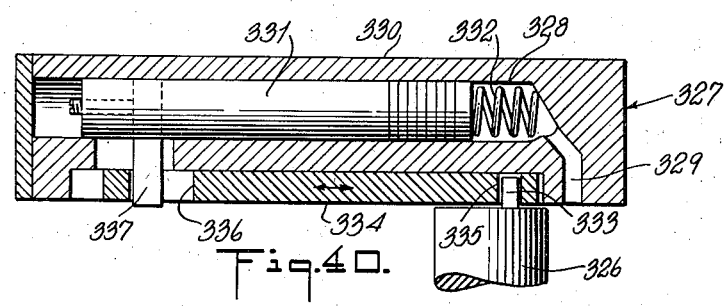
Figures 34, 35, 36, 37, 38, 39:
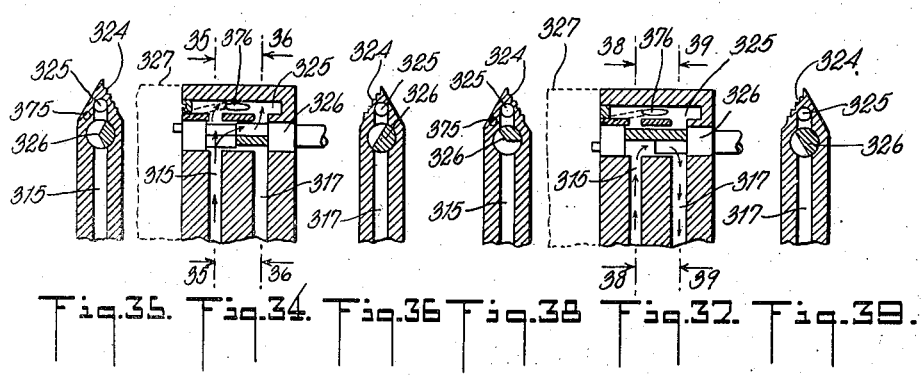
Figure 45:
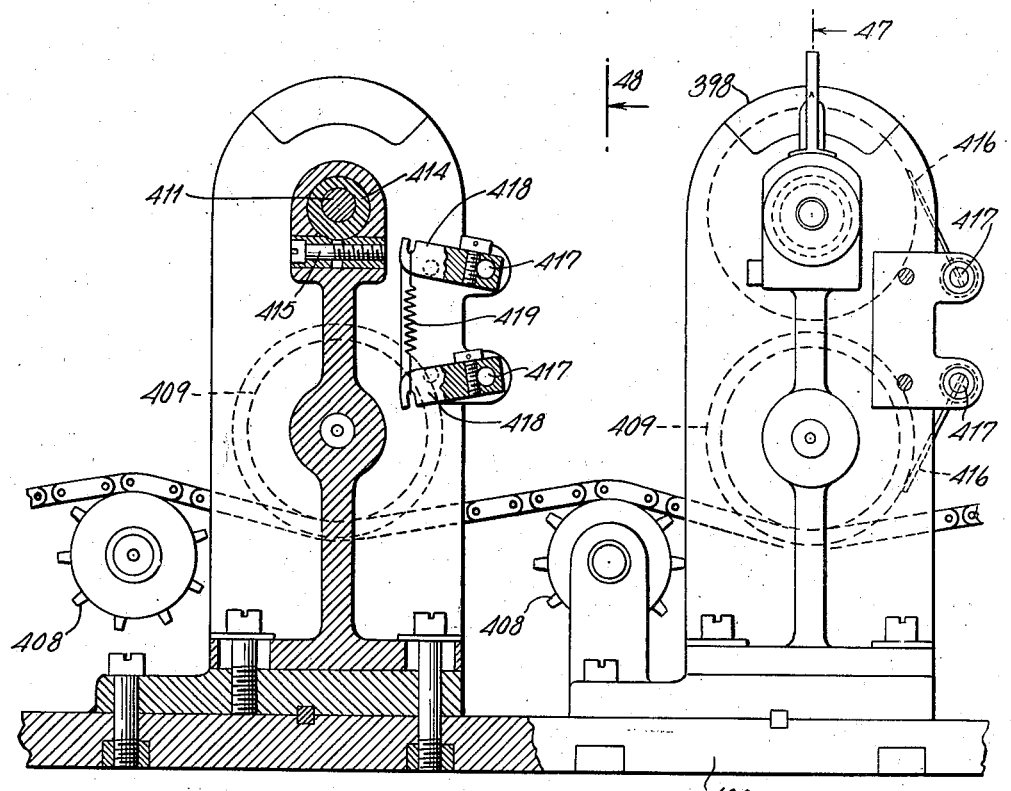
Figure 46:
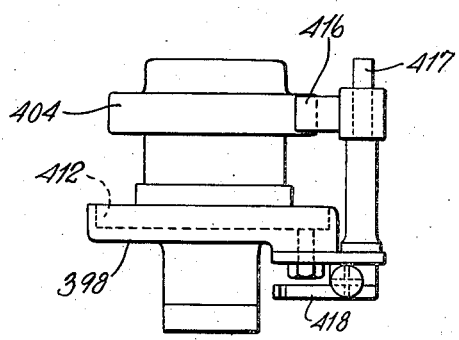
Figure 54:
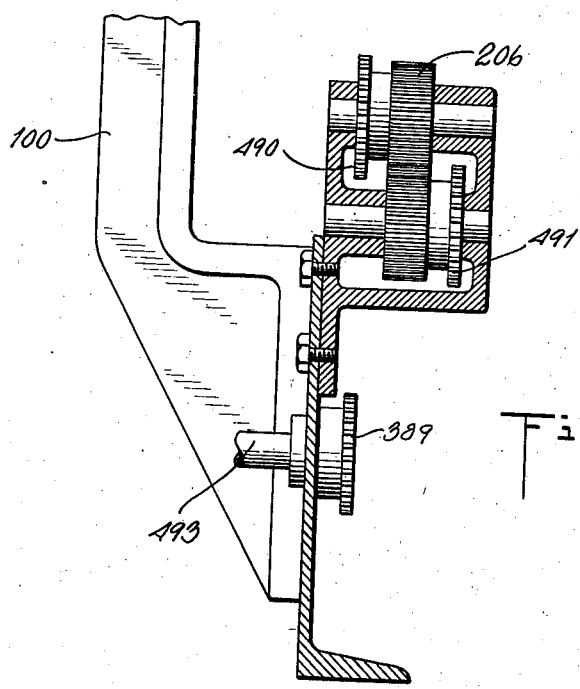
Figure 55:
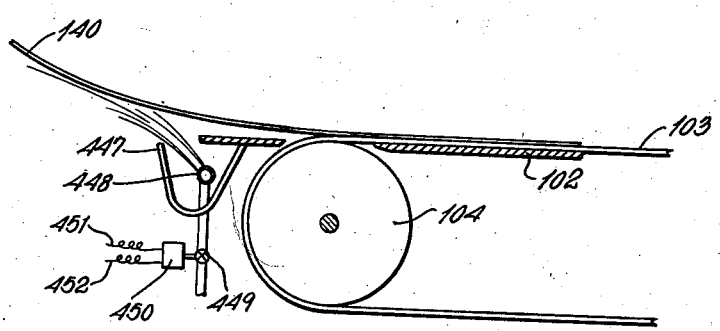

Figs. 11, 12 and 13 are sectional elevations of the edge belt part of the aligning mechanism taken on the lines 11—11, 12—12, and 13—13 respectively of Fig. 10;

Fig. 14 is a plan view of the caterpillar clamp portion of the machine;

Fig. 15 is a front elevation of the caterpillar clamp shown in Fig. 14;

Fig. 16 is a sectional elevation of the caterpillar clamp taken on the line 16—16 of Fig. 15;

Fig. 17 is an end sectional elevation of the caterpillar clamp and edge belt portions of the machine;

Fig. 17A is a side sectional elevation of holding and guiding means for holding and guiding the margin of the sheet material;

Fig. 18 is a plan view of slitting mechanism of the machine;

Fig. 19 is a sectional elevation of the slitting mechanism taken on the line 19—19 of Fig. 18 with parts thereof removed;

Fig. 20 is a sectional elevation of the slitting mechanism taken on the line 20—20 of Fig. 18;

Fig. 20A is a sectional elevation of the cleaning unit on the line 20A—20A of Fig. 18;

Fig. 21 is an end view of a portion of the slitting mechanism;

Figs. 22 and 23 are sectional elevations of the slitting mechanism taken respectively on the lines 22—22 and 23—23 of Fig. 19;

Fig. 24 is a plan view of the drive and clutch for actuating the slitting mechanism;

Fig. 25 is a front elevation of the drive and clutch shown in Fig. 24;

Fig. 26 is a detail elevation partly in section taken on the line 26—26 of Fig. 25;

Fig. 27 is a plan view of the reciprocating and latch means for the slitting mechanism;

Fig. 28 is a front elevation of the reciprocating and latch means shown in Fig. 27;

Fig. 29 is a detail sectional elevation taken on the line 29—29 of Fig. 28;

Fig. 30 is a plan view of the adhesive supply mechanism;

Fig. 31 is a side sectional elevation of the adhesive supply means taken on the line 31—31 of Fig. 30;

Fig. 32 is a front sectional elevation of the adhesive supply means taken on the line 32—32 of Fig. 30;

Fig. 33 is an end elevation of the adhesive ejector of the adhesive supply mechanism;

Fig. 34 is a plan sectional view of the valve control means of the adhesive ejector shown in open position for discharge of adhesive;

Figs. 35 and 36 are sectional elevations taken on the lines 35—35 and 36—36 respectively of Fig. 34;

Fig. 37 is a plan sectional view of the valve control means shown in Fig. 34 but with adhesive ejector in closed position;

Figs. 38 and 39 are sectional elevations taken on the lines 38—38 and 39—39 respectively of Fig. 37;

Fig. 40 is a plan sectional detail view on a larger scale of the adhesive draw-back and priming means associated with the adhesive ejector nozzle;

Fig. 41 is a front elevation of the wiper pad means;

Fig. 42 is a side elevation of the wiper pad means;

Fig. 43 is a top plan view of the reinforcement supply means;

Fig. 44 is a rear detail view of means for inserting the reinforcing element;

Fig. 45 is a side elevation partly in section of the slit closing and forming rolls;

Fig. 46 is a plan view of one of the closing roll units;

Fig. 47 is a side sectional elevation through one of the closing and forming rolls;

Fig. 48 is a side elevation, partly in section, of another of the closing and forming rolls;

Fig. 49 is a front elevation of the trimming mechanism;

Fig. 50 is a detail sectional elevation of the means for adjusting one of the gears of the mechanism shown in Fig. 49 taken on the line 50—50 of Fig. 49;

Fig. 51 is a side view of the adjustable gear shown in Fig. 50 taken on the line 51—51 of Fig. 49;

Fig. 52 is a vertical side section of the trimming mechanism taken on the line 52—52 of Fig. 49;

Fig. 53 is a plan view, partly in section, of a part of the trimming mechanism shown in Fig. 52;

Fig. 54 is a vertical side section of the reversing gears constituting part of the machine drive;

Fig. 55 is a front elevation of a portion of the delivery end of the machine; and Fig. 56 is a schematic wiring diagram of the machine.

In connection with the following description of the embodiment of this invention shown in the accompanying drawings, the machine will be described in connection with the reinforcing of the marginal portion of a flexible smooth surface rug of the type referred to hereinabove and when reference is made to operations performed on a "rug," it is to be understood that a flexible smooth surface rug is intended and that other sheet material may be handled by the machine.

Supporting and aligning means

Referring to the drawings, and more particularly to Figs. 1 to 13, the means for supporting, carrying and disposing a rug in proper alignment will be first described. The machine comprises a frame 100 supported by a plurality of legs 101. Supported by the frame is a horizontal flat-topped table 102. For carrying a rug along the table there are a plurality of carrying belts 103 which are driven by pulleys 104 on power shaft 105, and which pass over idler pulleys 106 on shaft 107. The pulleys 104 and 106 are disposed so as to protrude slightly through the top of the table 102 as shown clearly in Fig. 1A and the belts 103 in the upper travel are caused to slide along the upper surface of the table 102, the return travel being underneath the table. One of these belts which is designated 103a, supports the margin of the rug and in the upper travel thereof is trailed through a metal trough 108 which is clearly shown in Figs. 3, 4 and 12 and the bottom of which is at substantially the same level as the upper surface of table 102.

In addition to the belts 103, there are aligning belts 109 which are operated from pulleys 110 on power shaft 111, the latter shaft being driven from shaft 105 by sprocket chain 112. The pulleys 110, as well as the idler pulleys 113 on shafts 114 and 115, are disposed so as to protrude through openings in the table 102 and cause the belts 109 to slide along the upper surface of the table. The shafts 111, 114 and 115 are inclined slightly to shafts 105 and 107, which latter extend straight across the table, with the result that when the belts 103 and 109 are moved in the direction of the arrows, a rug that is being carried along by the belts 103 and 103a will be urged in the direction of the master belt 103a by the belts 109, thereby cooperating with the aligning belt 116 in the alignment of the rug as the rug is carried through the machine.

Referring more particularly to Figs. 10 to 13, there is the vertical aligning belt 116 which moves at the same rate as the carrying belts 103 and master belt 103a and against which the edge of a rug carried by belts 103 and master belt 103a is caused to abut by the action of the inclined belts 109. The vertical aligning belt provides aligning stop means, and this stop means is provided with a movable surface. The belt 116 is carried between power pulley 117 and idler pulley 118. Between the pulleys 117 and 118 are vertical guides 119 which have support rails 120 to keep the belt 116 from sagging. The pulley 117 is fixed to rotatable shaft 121 which is driven through bevel gears 122 by sprocket wheel 123 on shaft 124. The sprocket wheel 123 is driven by chain 126 and sprocket wheel 125 on driven shaft 111. The idler pulley 118 is carried on an upright shaft 127 carried by a horizontal plate 128 which is slidable longitudinally with respect to the plate 129 that is fixed to frame 100 and which has longitudinally extending slots 130 through which bolts 131 pass. By adjusting plate 128 and fixing it in position by bolts 134, the tension on the belt 116 can be adjusted as desired.

The aligning guides 119 are carried by uprights 132 which are fixed to plate 133 that is secured to frame 100 by bolts 134. Slots 135 are provided so that spacing of the aligning guides 119 from the belt 103a can be adjusted and maintained as desired. A retainer angles 136 (shown in Fig. 12 but not in Fig. 10), maintains the belt 116 snugly against guide 119.

In order to press the marginal portion of the rug downwardly against the master belt 103a, a plate 137 is fixed to the guide 119 adjacent the master belt 103a and is positioned directly above and spaced slightly from the belt 103a. This plate is shown in Figs. 2 and 12 but has been largely omitted from Fig. 10 for clarity. In the plate 137 are holes 138 through which spherical weights 139 such as steel balls can partially pass so that the weight thereof will rest upon rug 140 that is carried by the belt 103a. The spherical weights 139 weight down the margin of the rug 140 while providing rolling friction and while being maintained in position by the holes 138 in the plate 137.

The trough 108 is supported by an I-beam 141 which is secured in position by levelling bolts 142 and height-adjusting nut 143.

Referring to Figs. 5 and 6, the power for operating the carrying and aligning belts, as well as for operating other units of the machine, is supplied by the motor 484 through reduction gears 485, the shaft 105 being rotated by drive chain 486.

Pick-up means

In order to facilitate the feeding of rugs into the machine, the machine is provided with pick-up rolls 144, reference being made to Figs. 1A, 2, 8 and 9. A pick-up roll is disposed above each of the pulleys 106 for belts 103 and is carried by a cross beam 145 extending between the upright supports 146. The position of the pick-up rolls is controlled by air cylinder 147 through the double bell crank 148, a certain amount of play being provided by the slot 149. Compressed air is supplied to the air cylinder 147 by air lines 150, and the action of the air cylinder is controlled by operation of the solenoid valve 151, which is electrically actuated through wires 152 and 152a. Normally each pick-up roll 144 is retracted and does not contact the belt 103, but by appropriate switches and electrical connections to be described below in connection with the wiring diagram, each pick-up roll is caused to clamp the leading portion of a rug being fed into the machine so that the rug will be positively drawn onto the table 102 and onto belts 103 before the pick-up rolls are again retracted. After being drawn upon belts 103, the rugs are carried forward and aligned as above described.

Clamping means

After a rug has been fed into the machine and brought into alignment, the aligned margin is clamped in aligned position while permitting the rug to be advanced and carried toward the rug margin operational mechanisms to be described. The clamping means referred to is shown in Figs. 1, 1A, 14, 15, 16 and 17. Generally speaking, the clamping means comprises a plurality of rollers 153 and means for elevating and lowering the rollers as a group, the rug margin being clamped between the rollers and the master belt 103a.

Rigidly attached to frame 100 by brackets 154 are spaced parallel frame members 155. Between the frame members are the roller carrying bars 156 and 156'. The bar 156' is slidable longitudinally of bar 157 and can be secured thereto by bolts 487. The bar 157 and the bar 156 are maintained in fixed relation to each other by cross bar 158 and brace 159. A set screw 160 is in threaded engagement with cross bar 158 and is pivotally secured to block 161 on bar 156', and enables the bars 156 and 156' to be adjusted longitudinally relative to each other. Once adjusted, the bar 156' can be secured in fixed position relative to bar 157 by the bolts 487. In this manner the axles 162 for the rollers 153 can have the angular relation thereof with respect to the master belt 103a adjusted as desired. The axles 162 are journaled in bearing blocks 163 which are carried at the lower ends of rods 164 which pass slidably through holes in the horizontal flange portion of bars 156 and 156'. These rods are urged downwardly by the compression springs 165 between the upper flanges of bars 156 and 156' and the nuts 166. The rods 164 are retained in position by the nuts 167. By this arrangement, when the bars 156 and 156' are lowered so that the rollers 153 contact the margin of the rug 140, further lowering of the bars 156, 156' will result in the bars 156, 156' being slidable downwardly relatively to the rods 164 which remain stationary and will result in the rollers 153 being resiliently pressed by the compression springs 165 against the margin of the rug 140 and thereby clamping the margin of the rug between the rollers 153 and the master belt 103a.

The bars 156, 156' are suspended from the frame members 155 by bell cranks 168, which are pivoted to stub shafts 169 fixed to the frame members 155. The horizontal arms of the bell cranks 168 are pivoted to the bars 156, 156' as shown, while the vertical arms of the bell cranks 168 are curved inwardly as a yoke as shown in Fig. 16 and pivoted to the end of links 170. The other ends of the links 170 are hingedly attached to the oppositely acting piston rods 171 of the air cylinder 172 to which the air lines 173 are connected. The air cylinder is supported by providing rollers 286 above and below the links 170, the rollers being carried by the cross bars 174 between the frame members 155. It is apparent that when the air cylinder 172 is actuated to force the piston rods 171 outwardly, the bars 156, 156' will be raised relatively to frame members 155 so as to draw the rollers up and out of contact with respect to rug 140 and master belt 103a. Conversely, when the piston rods 171 are drawn inwardly the bars 156, 156' will be lowered so that the rollers will effectively clamp the rug 140 between the rollers and the master belt 103a. The movement of the bars 156 and 156' relative to frame members 155 can be guided by guide blocks 488. The action of the air cylinder 172 is controlled by operation of the solenoid valve 175 which is electrically actuated by a circuit comprising the wires 176 and 176a which form part of a control circuit to be described below. The air cylinder 172 is actuated so that after the rug margin has been brought underneath the clamping rollers 153 when in elevated position, the clamping rollers are then lowered to clamping position while the rug continues to progress into the rug margin operational mechanisms to be described below.

Holding means

Referring particularly to Figs. 1 and 17A, the marginal portion is held in proper position to be acted upon by the rug margin operational mechanisms after it leaves the clamping rollers 153, by further holding means which are in the form of a guided upper belt 177, that travels with and above the master belt 103a, with the margin of the rug 140 therebetween. As shown in Fig. 1, the belt 177 travels over pulleys 178, 179, 180, 181 and 182. The pulley 180 is adjustable by the threaded adjusting rod 183 so as to have desired tension. The belt 177 is driven by pulley 182 which rotates with power shaft 184 (see Figs. 5 and 6 also) so that it will travel at the same rate as the rate of travel of belt 103a. The pulleys 178 to 182 are supported by an upper frame 185 which is supported from frame 100 by brackets 154, by bracket 186 and cross member 193. In order to apply pressure to the belt 177 in its travel immediately overlying the belt 103a, there are weights 187 which are distributed along the longitudinal extent of the lower reach of the belt 177 and which may, if desired, be adjusted as to weight by superposing one on top of the other as shown. These weights are prevented from moving in the direction of the forward movement of the belt 177 by the upstanding lugs 489 which bear against the fixed cross bars 188 and which are integral with the weights and permit vertical movement of the weights between the walls 189. The lowermost weight is preferably provided with side guides 190 for preserving proper relation with respect to the belt 177. The walls 189 are supported in any suitable manner such as by a plurality of bars 191 and bracket 194 fixed to upper frame member 185. Any other type of weight may be used, and the weights may be in rolling or sliding friction with respect to the belt 177 and the amount of weight that is employed may be varied as desired. The weighted belt 177 is employed as holding means from adjacent the pulley 179 (prior to the slitting mechanism) to adjacent the pulley 182 (subsequent to the trimming mechanism) and during the travel following the holding rollers 153 cooperates with the rollers 153 as holding means for the marginal portion of the rog.

Slitting means—Reciprocating mechanism

The slitting mechanism whereby the margin of the rug is slit laterally inwardly adjacent the edge is shown particularly in Fig. 1 and in Figs. 18 to 29. It is a feature of this slitting mechanism that it operates to slit the margin of the rug as aligned and held by the aligning and holding mechanisms above described. It is a further feature of the slitting mechanism that the slitting is accomplished by relative movement between the cutting tool and the rug supporting and carrying means, and, according to this invention, the cutting tool is caused to initiate its stroke while this relative motion is gradual and then have the speed of the stroke greatly increased before the slitting stroke is completed. Further features of the slitting mechanism relate to the provision of knife holding means which presents a plurality of cutting tools which are successively used in slitting the marginal portion of rugs and after use are removed out of operative position and cleaned. Other features relate to the actuation of the mechanisms by the relative position of the rug thereto as held in aligned position by the holding means.

The unit which carries the slitting tool is mounted for reciprocation in the direction of the longitudinal extent of the rug margin to be slit thereby. For this purpose upper and lower tracks 195 and 195', respectively, are fixed by suitable bracket means 196 to the frame 100. Pairs of inclined rollers 197 integral with the slitting unit permit horizontal travel of the slitting unit guided and supported by said tracks. The slitting unit is provided with guide members 198 which aid in guiding the rug margin to the guide rolls 199 and 200 which feed the rug margin to the slitting knife 201 so that the slitting of the rug margin will be in the precise location that is desired. The means for carrying out these operations, including the action of the knife in slitting the edge of the rug, is clearly shown, particularly in Figs. 19 and 20.

The guide rollers 199 and 200 are positively driven by means which provides peripheral speed corresponding to the rate of movement of the rug margin past the slitting knife, notwithstanding variations in speed of the rug margin relative to the slitting knife. To accomplish this purpose, power for driving the guide rollers in the embodiment shown (Figs. 5, 6, 18, 19, 20, 22, 23) is derived from the motor 484 which also supplies power for the belts 103 and the master belt 103a in the manner described hereinabove from power shaft 105. The power shaft 105 has a sprocket wheel 202 rotatable therewith which drives the chain belt 203 that in turn, through reversing gears 204, drives sprocket chain 205. The chain 205 actuates other mechanisms as will be described below but constitutes part of the drive for the guide rolls of the slitting unit by passing over idler gear 287 and over the sprocket gear 490 to actuate the reversing gears 206 which in turn drive the sprocket chain 207, in the direction shown from sprocket gear 491 (see also Fig. 54). The chain 207 travels over the idler gear 208, fixed to the frame, over the driving sprocket gear 209 of the slitting unit, and underneath the idler gear 210 that is carried by the slitting unit. The upper reach of chain drive 207 is carried at two levels, each level being parallel to the lower reach. The guide roller 200 is driven directly by sprocket chain 211 which passes over the sprocket gear 212 that rotates with driving gear 209, over the sprocket gear 213, and over the sprocket gear 214 with which the guide roller 200 rotates. The guide roller 199 is driven from sprocket gear 213 which is fixed to the rotatable shaft 215 that also carries fixed thereto the sprocket gear 216. The sprocket gear 216 draws the sprocket chain 217 over sprocket gear 218 with which rotates the sprocket gear 219 that drives the sprocket chain 220 which passes over sprocket gear 221. The sprocket gear 221 is fixed to shaft 222 and the gear 223 that rotates with the shaft 222 coacts with the gear 224 with which the guide roller 199 rotates. The gear system between sprocket gear 213 and guide roller 199 is such that the peripheral speed of the guide roller 199 is at all times the same as the peripheral speed of the guide roller 200.

When the slitting unit is stationary relative to the frame, the system of gears and chain drives from the main power shaft 105 is such that the peripheral speed of the guide rollers 199 and 200 is the same as the linear speed of the master belt 103a. If during the slitting operation the slitting unit is moved relatively to the main frame of the machine along the tracks 195, 195', the peripheral speed of the guide rollers 199 and 200 will be varied to an extent corresponding to the variation in the rate of travel of the slitting unit, and, due to the arrangement above described, the peripheral speed of the guide rollers 199 and 200 will be the same as the linear speed of a rug margin relative to the slitting tool whether the slitting unit is stationary relative to the frame of the machine as a whole or is being moved in one direction or the other relative to the frame. Thus if the slitting unit is in motion to the left in Fig. 6, the peripheral speed of the guide rollers 199 and 200 will be reduced, while the peripheral speed of guide roller 199 and 200 will be increased during motion of the slitting unit to the right, so as to maintain such peripheral speed the same as the speed of the rug margin past the slitting tool carried by the slitting unit.

The slitting unit is caused to reciprocate on the tracks 195, 195' by means of the connecting rod 225 which has at one end a pivoted connection 226 with the bracket 227 fixed to the principal frame member 228 of the slitting unit and at the other end a pivoted connection 229 at the end of crank arm 230 which is secured to rotatable shaft 231. The shaft 231 is driven from the main power shaft 105, the connection being such that the shaft 231 does not rotate but can be actuated to rotate through one complete revolution and then stop rotation until the control impulse of making another complete revolution occurs. Referring to Figs. 5, 7, 24, 25, 26, 27, 28 and 29, one type of means for accomplishing this result is shown. Sprocket chain 232 operates between the sprocket gear 233 fixed to power shaft 105 and sprocket gear 234 of a single revolution clutch 235. The clutch 235 is of any standard known construction and is shown as comprising a control disk 236. Upon actuation of the solenoid 237 to retract arm 238 secured to pivoted arm 239 out of the notch 240 in the control disk 236, the continuously rotating sprocket gear 234 become operatively connected with shaft 231 so as to cause rotation of shaft 231. During the first part of the revolution of shaft 231 the solenoid 237 is rendered inactive so that the arm 238 rests against the periphery of the disk 236 again engaging notch 240 at the end of the revolution thereby releasing the clutch mechanism so that after one revolution of the shaft 231 it is disassociated from driving gear 234.

In order to minimize any overrun of the crank arm 230, the arm 230 has fixed thereto a cam block 241 having a notch 242 therein in which notch the cam wheel 243 rests when the notch is in registering position relative thereto. The cam wheel 243 is carried by arm 244 which is pivoted for rotation about shaft 245 fixed to frame 100, which is urged in the direction of the cam block 241 by compression spring 246 and the motion of which in the opposite direction is limited by the rod 247 and stop nut 248. The cam wheel carried by arm 244 and the notch 242 in the cam block 241 act as a resilient latch for preventing overrun of the crank arm 230 and for maintaining the crank arm 230 and the slitting unit in normal rest position. Prevention of overrun of the slitting unit may, if desired, be arrested by an arresting device such as that indicated in Fig. 1, which shows a link member 251 between the slitting unit and the arm 252 which actuates an arresting unit 253. The arresting unit 253 may be of any type and may be a pneumatic arrester which permits the arm 252 to be rotated to the left without restraining effect, but which restrains movement of the arm 252 to the right in an increasing amount resulting from building up an air pressure until the rightward movement of the slitting has been completed. Thereafter the air pressure is released preparatory to another cycle of the slitting unit. Such device serves to insure the cessation of rotation of the crank arm 230 when the cam wheel 243 reaches notch 242 of the cam block 241.

Activation of solenoid 237 is through lines 249 and 250 which are controlled so as to effect actuation of the clutch 237 and one complete reciprocation of the slitter unit by control switches the action of which will be described below. It may be mentioned at this point, however, that when the rug, in the progress through the machine and after having been aligned and clamped in position by the clamping rolls 153, approaches the slitting unit, the solenoid 237 is actuated to start movement of the slitting unit in the same direction as the direction of movement of the rug but at a lesser speed. When the rug edge reaches the slitting knife, the slitting unit has attained its maximum rate of forward movement and the speed of the rug relative to the slitting knife is only a fraction of the speed of the rug relative to the frame of the machine as a whole. Thus, in ordinary practice the rug is carried through the machine by belts 103 and 103a at the rate of about 150 feet per minute, but the speed of the rug at the moment of initial impact of the leading portion of the margin thereof with the slitting knife is only about 50 feet per minute relative to the slitting knife. By this means danger of distorting the margin of the rug at the moment of initial impact with the slitting knife is overcome. After initial impact of the rug margin with the slitting knife carried by the slitting unit, the speed of the rug margin relative to the slitting knife increases and if the rug has not passed the slitting knife when the slitting unit has arrived at the position of extreme leftward movement of the slitting unit, the speed of the knife relative to the rug margin, upon the return stroke of the slitting unit, will become considerably greater than the speed at which the rug is carried by the belts 103 and 103a. However, after the slitting has been instituted, the rate at which the slitting knife is caused to pass through the material of the rug can be greatly increased without undue distortion of the rug margin.

Slitting means—Turret mechanism

It is of great advantage that the slitting knife 201 be removed from operative position for slitting the aligned margin of the rug after having performed a slitting operation, and cleaned prior to reuse in the slitting operation. In order to accomplish this purpose a plurality of the slitting knives 201 is employed and means are provided for removing each slitting knife from operative position and cleaning it before it is returned to operative position, this operation being automatic. The knives are carried by turret member 254, each knife being clamped in place by a clamping piece 255 and a clamping screw 256. The turret is rotatable with shaft 257 in fixed bearings 258 and rotation of the turret assembly is effected by the rack 259 and pinion 260. The pinion 260 is connected to the turret 254 by clutch mechanism so that when the rack 259 is moved to the left (Fig. 18) the turret remains stationary, but when the rack is moved to the right the turret is rotated in a counterclockwise direction. During rotation of the turret 254 the knives 201 pass through a cleaning unit 261 carried by the frame arm 262. The cleaning unit may be of any suitable form and may, as shown in Fig. 20A, consist of a receptacle 263 having a narrow opening for the passage of the knives 201 protruding from turret 254 therethrough between two pads 264; one above and one below the knife 201, which are saturated with a solvent for the binder material contained in the sheetlike base of the rug. For example, if the knife operates to slit a felt sheetlike base of a rug which felt is impregnated with asphalt binder, the felt pads 264 may carry a solvent for asphalt such as naphtha or carbon tetrachloride which dissolves any asphalt adhering to the knives and permits the knives to be wiped clean by the felt pads.

The turret 254 is rotated so as to bring a clean knife into operating position for slitting the margin of the rug and to maintain the knife in such position by means which is shown especially in Figs. 18, 20 and 21 and is carried on the frame arm 262 which is swingably mounted by bolts 265 and 266 between the arms of the bracket 227 and which can be latched in position by means of latch member 267. Slidably mounted with respect to the frame arm 262, by means of the spacer guides 262a, the retainer members 262b and the bolts 262c, is a bar 268 which carries fixed thereto the rack 259. The bar 268 is actuated in one direction or the other by the piston rod 269 which is actuatable by air cylinder 270 in either direction, the piston rod being pivotally connected to plate 271 which is fixed to slidable bar 268 by screw 268a. An adjustable stop 272 limits the movement to the right (Fig. 18) of the piston rod 269. Rigidly carried by the slidable bar 268 is a stop member 273 and associated support 274. The end of the stop member 273 is located so that with the parts in the position shown in Fig. 18, it abuts against one of the pins 275 which are fixed to the turret member 254 at the same intervals of rotational degrees as the knives carried by the turret member, thereby preventing rotation of the turret member in a counter-clockwise direction and securely holding the turret member in position when the rug edge is being slit by the knives that are in operative position. When the piston rod is caused to move to the left (Fig. 18), the bar 268 and rack 259 are moved to the left thus rotating gear 260 in a clockwise direction. Rotation of the gear 260 in a clockwise direction does not, due to the action of the above described clutch associated therewith, cause rotation of the turret 254 and in fact turret member 254 is prevented from rotating in a clockwise direction by the yieldable latch 276 which is pivoted by pin 277 to the upper spacer guide 262a, which is maintained in rigid relation with respect to frame arm 262, and has a notch 278 therein which acts as a stop to restrain the pins 275 of turret 254 from being moved in a clockwise direction. When, however, the turret 254 is moved in a counter-clockwise direction, the pins 275 push the latch 276 out of the way against the tension of spring 279. Movement of the piston rod 269 and bar 268 to the left also moves stop 273 to the left so that it no longer acts to prevent rotation of the turret 254 in a counterclockwise direction. When the piston rod and bar 268 are moved to the right the turret is rotated in a counterclockwise direction and the position of the stops 272 and 273 are adjusted so that upon completion of the throw of the piston rod 269 to the right a clean knife will have been brought to proper position through the relationship of the succeeding stop pin 275 with stop 273, for slitting the marginal portion of the rug being carried through the slitter unit. The air cylinder 270 is controlled by the action of a solenoid 279 forming part of circuit lines 280 and 281 which in turn are controlled by the action of the switch arrangement to be described below. The solenoid actuates a valve mechanism 282 to control the air in air lines 283, 284 and 285, which supply air under the control of the valve mechanism to the air cylinder 270. During operation of the device, the turret mechanism remains stationary during the slitting of the margin of a rug, but after the rug margin has left the slitting unit, the turret mechanism is actuated so as to bring a clean knife into operating position before the next rug margin is acted upon by the slitting unit.

Adhesive supply means

After the rug margin has been slit by the slitting mechanism, means are provided for introducing into the recess formed by the knife of the slitting unit a suitable adhesive. This is accomplished by adhesive supply means which comprises a nozzle block 316 and means for ejecting adhesive from the nozzle block into the recess in the rug margin at the proper time. The nozzle from which adhesive is ejected has adjacent thereto spreading means for spreading the adhesive uniformly in the recess. Wiping means are associated with the nozzle and spreading means for maintaining the rug margin in intimate contact with the nozzle and spreading means.

Between the slitting knife and the adhesive nozzle a spreading bar 291 is preferably employed for the purpose of keeping the interior surfaces of the recess formed by the slitting knife spread apart for entry of the end of the adhesive nozzle therein. A portion only of this bar is shown in Fig. 19 and one end of the bar 291 is supported by the frame of the slitting unit by suitable means (not shown). The other end of the spreading bar 291 is carried by the nozzle block 316 (Fig. 30). Since the slitting unit is reciprocated relatively to the frame 100 and since the adhesive supply unit remains stationary; the rod 291 is made in two portions, one of which is slidable telescopically within the other as indicated by the portions 291a and 291b in Fig. 30. By this expedient, a continuous spreader bar 291 is provided between the slitting unit and the adhesive supply unit regardless of the relative positions of these units, which spreader bar occupies the space between the inner surfaces of the recess and maintains such surfaces spaced from each other.

Referring particularly to Figs. 30 to 42, the adhesive supply nozzle block and pump are carried from frame 100 by a bracket 293. The positions of these parts is adjustable by the set screw 294 and bolt 295. The upper support plate 296 has rods 297 depending therefrom upon which slide tubes 298 that are fixed to the base of the heated adhesive container 299 which is supported from chain wheel 301 by the chain 300 that is in turn connected to the continuous chain 302 (Fig. 1), one end of which passes over a sprocket wheel 303 that can be manually rotated by crank 304. By rotation of the crank 304 in one direction the adhesive container 299 can be lowered away for refilling, cleaning, etc. By rotation of the crank 304 in the opposite direction the container 299 can be elevated to the position shown in Figs. 31 and 32 and by ratchet stop (not shown) maintained in such position. The adhesive material is contained in the inner container 305 and any suitable means may be employed for heating the contents thereof. In the device shown, the inner container 305 is within and spaced from the outer container 299, and in the intervening space a liquid bath is provided which can be heated by electric heating element 306 disposed therein, and connected to any convenient source of electric current that may be controlled by the switch 308 and that may be further controlled for maintaining the temperature of the adhesive constant by the thermostatic control means 309 which is connected to the electric heating element 308 by lines 310.

Within the container 305 is a gear pump 311 which has inlet 312 and forces the adhesive up through outlet 313 in the direction of the arrows and thence through passage 314 to the feed passage 315 of the nozzle block 316. By the valve mechanism to be described, the adhesive is returned through return passage 317 and line 318 to the container 305 and when the pump 311 is operated continuously a continuous flow of adhesive is provided from and back to the adhesive container, except for the interval when adhesive is ejected from the nozzle, thereby keeping the lines and the nozzle block heated so as to prevent clogging. The drive for the pump is provided by the motor 319 through the belt 320 and pulleys 321 and 322 which are connected respectively with the power shaft of the motor and the power shaft 323 of the pump 311. The motor is conveniently supported on a bracket 382 (Fig. 1) which is swingably mounted on frame 100 so that the motor can be swung out of the way for refilling the adhesive container.

Adhesive supply means—Nozzle mechanism

The nozzle block 316 has a grid 324 at the outer end of the V-shaped extremity thereof, the spaces between the solid strips of the grid communicating with the nozzle channel 325. The feed to the nozzle channel 325 is controlled by a rotary valve 326, the action of which is illustrated in Figs. 35 to 39. When the rotary valve 326 is in the position shown in Figs. 34, 35 and 36, the adhesive supplied through feed passage 315 is directed into the nozzle channel 325 and thence out through the openings in the grid 324 for application to the interior of the recess in the margin of the rug 140, while being prevented from returning through return passage 317. In this manner the adhesive is forced out through the nozzle under the full pressure supplied by the pump 311. When the rotary valve 326 is in the position shown in Figs. 37, 38 and 39, the adhesive supplied through feed passage 315 is prevented from passing into the nozzle channel 325 and is directed to return passage 317 for the continuous circulatory flow of adhesive from and back to the adhesive reservoir 305 that has been described hereinabove.

Associated with the nozzle block is a mechanism which acts as a grid cleaning device after the supply of adhesive to the grid is shut off and as a priming device when the supply of adhesive to the grid is initiated. This mechanism is indicated generally by the reference character 327 and has been shown on an enlarged scale in Fig. 40 for purposes of clarity, the position of the mechanism with reference to the nozzle block 316 being indicated by dotted lines in Figs. 34 and 37. This mechanism comprises a bore 328 in block 330 having a passage 329 at one end thereof that is in registration with the end of the channel drain passage 375 which has an opening 376 in the bottom of nozzle channel 325. Within the bore 328 is a piston 331 which is urged away from the passage 329 by a compression spring 332. The piston 331 is actuatable against the action of the spring 332 by rotary valve 326 by means of the eccentric pin 333 that coacts with a slit 335 in plate 334. The plate 334 has another slot 336 adjacent the opposite end thereof which provides a lost motion connection for the pin 337 carried by piston 331. In Fig. 40 the piston 331 is in the position that it occupies when the rotary valve is in the position shown in Figs. 34, 35 and 36. In other words, the piston has been drawn by the eccentric pin 333 in the rotary valve 326 against the compression spring 332. However, when the rotary valve 326 is turned to the position shown in Figs. 38, 39 and 40, the plate 334 is moved so as to enable the spring 332 to push the piston away from the passage 329. Therefore, at the moment the supply of adhesive is cut off from the nozzle channel 325, the piston in retracting in the bore 328, sucks at least part of the adhesive in channel 325 and in the passages in the grid 324 back into the bore 328 thereby effectively cleaning the passages in the grid and preventing dripping of adhesive from the grid and the occurrence of an excessive amount of adhesive on the grid when the next succeeding rug margin is brought in contact therewith. As shown, it is preferable to suck the adhesive out from the bottom of the channel 325 through port 376. It is also apparent that when the rotary valve 326 is again turned to the position shown in Figs. 34, 35 and 36, there occurs at the moment of turning of the valve, a discharge of the adhesive contained in the bore 328 as a result of the action of the eccentric pin 333 carried by the rotary valve in driving the piston 331 forward. The result is that at the instant of desired initial application of adhesive to the recess in the rug margin there is a priming action whereby the normal supply of adhesive is briefly supplemented, thereby assuring thorough application of adhesive from the moment of initial discharge of adhesive from the grid of the nozzle.

The rotary valve 326 is actuated by a solenoid 338. Rotationally connected to the end of arm 339 to which rotary valve 326 is fixed (see Fig. 33) is a link 340 which is rotationally connected to the end of lever 341 pivoted to fixed pivot 342. A rod 343 is slidably connected to the other end of lever 341 and passes through a fixed guide 344 and is rotationally connected at its lower end to lever 345 pivoted about fixed pivot 346. The other end of lever 345 is connected by link 347 to the armature 348 of the solenoid 338. The armature of the solenoid is normally extended and in such case the linkage is such that the rotary valve does not permit ejection of adhesive from the nozzle block. When the solenoid 338 is activated to retract the solenoid armature, the rotary valve is moved to position requiring adhesive to be ejected from the nozzle block. In case of clogging of the rotary valve due to hardening of the adhesive, a compression spring 349 is interposed between the nut on the end of rod 343 and the lever 341 so as to provide a yielding linkage for protection of the solenoid 338. The solenoid 338 is electrically operated by lines 350 and 351 which constitute part of the electrical control system to be described below.

In usual operation the rotary valve 326 is actuated so that adhesive will be ejected from the nozzle block just after the leading portion of the rug margin covers the end of the nozzle block and to cut off the supply of adhesive just before the trailing portion of the rug leaves the nozzle block. As the rug margin passes the nozzle block, the adhesive injected into the recess is spread by the V-shaped spreader 352 at the end of block 327 and the spreader 353 which is at the end of block 380. The dimensions of the V-shaped spreaders 352 and 353 are similar to those of the V-shaped extremity of the nozzle block 316 and preferably the surfaces of the spreaders 352 and 353 have fluting extending in the direction of the movement of the rug margin thereby. However, the end of the spreader 353 has a guide recess thereon constituting part of the mechanism for introducing the reinforcing element into the recess on the rug margin as will be described hereinbelow.

*Adhesive supply means—Wiper mechanism*

Preferably, as the rug margin passes the nozzle block 316 with the end of the nozzle block inserted in the recess in the margin of the rug, a wiper pad 354 is brought to bear on the upper surface of the portion of the rug overlying the end of the nozzle block. Means for accomplishing this result are shown in Figs. 41 and 42. The wiper pad is carried at the lower end of a bar 355 which is attached to the surface of a plate 356 that, by guides 357, is mounted for vertical movement relative to the fixed support plate 358. For convenience the bar 355 can be provided with a manually operated latch 359 which cooperates with lugs 360 and 361 so as to permit quick detachability of the bar 355 and wiper pad 354. A reversing lever 362 pivoted about fixed pivot 363 has one end rotationally connected to slidable plate 356 and the other end rotationally connected to the armature 364 of the solenoid 365. The armature 364 is normally maintained in extended position by the tension spring 366 which causes the wiper pad to be retracted out of contact with the end of the nozzle block 354 or portion of the rug margin overlying the nozzle block. However, upon actuation of the solenoid 365 the wiper pad 354 is brought down upon the portion of the rug margin overlying the nozzle block to the position shown in Fig. 42. Actuation of the solenoid 365 occurs when solenoid 338 (which actuates the rotary valve 326 to eject adhesive) is actuated. When solenoid 338 is actuated to retract the armature thereof, lever 345 is moved to close the switch 367 which controls the circuit consisting of lines 368, 369 and 370 that serves, when closed, to actuate solenoid 365.

The wiper pad 354 covers the grid 324 of the nozzle block and the adjacent end of spreader 352. Another wiper pad 354' is designed to cover the spreader 353 and since the wiper pad 354' is actuated by mechanisms the same as the mechanisms utilized for actuating the wiper pad 354, the parts of the two mechanisms have been indicated by like reference characters except that the solenoid for actuating pad 354' is indicated by the reference character 365'. Since the timing 386, the details of which are not shown. Since as the timing for actuating the solenoid 365, solenoid 365' is part of a circuit including lines 372 and 372a that is independently controlled in the manner to be described below.

Adhesive supply means—Nozzle cover

It is preferable that the grid 324 at the end of the nozzle block be covered when the end of the nozzle block is not inserted in the recess in the rug margin for application of adhesive therein. In the embodiment shown, a sliding cover 371 is employed which serves to support the leading edge of the rug margin as the nozzle block is inserted in the recess, thus preventing such leading edge from picking up any accumulation of adhesive on the surface of the nozzle. The cover is slidable on a support block 377, the upper surface of which has the same inclination as the upper surface of the grid 324 and is actuated by armature 364 of solenoid 365 through the link 378 and the pivoted bell crank lever 379. When the solenoid is actuated to retract the armature 364 and lower the wiping pad 354, the cover 371 is at the same time retracted to the position shown in Fig. 42. On the other hand, when the wiping pad 354 is retracted, the mechanical connection is such that the cover 371 is moved down over the grid 324.

Reinforcement supply means

After the adhesive has been introduced into the recess in the margin of the rug, an elongated reinforcing element is inserted in the recess. This is accomplished by guiding the reinforcing element into the recess at the proper time and cutting the reinforcing element to the proper length. Preferably the reinforcing element is initially caused to be positively fed into the recess, and once having been introduced into the recess, the positive feed of the reinforcing element is discontinued and the movement of the rug margin relative to the reinforcement supply means causes the reinforcement to become deposited in the slit in the rug margin.

Referring particularly to Figs. 1, 6, 43 and 44, the elongated reinforcement 385, which may be in the form of a wire, is carried by the reel 383 and is guided by the guide tube 384 from the reel 383 through the recess in the spreader 353. A spring guide member 492 compensates for inertia of reel 383 at commencement of the wire feed, and assists in directing the reinforcing element 385 into the guide tube 384. Within the housing 386 which is supported by the frame 100 are means for positively feeding the reinforcing element at the desired time, for cutting the reinforcing element to desired length and for preventing any back feed of the uncut reinforcing element. Within the housing 386 are rolls 387 which are driven so that the peripheral rate will be substantially the rate of travel of the rug margin past the outlet end of guide tube 384. The rolls 387 are normally spaced apart and are normally ineffective to advance the reinforcing element. However, by actuation of the solenoid 388, one of the rolls is moved so that the reinforcing element is gripped between the rolls 387 and positively advanced. The rolls 387 are positively driven from chain belt 205 (Fig. 6) which passes over the sprocket gear 389 which is rigidly mounted in the same shaft 493 that sprocket gear 390 (Fig. 1) is mounted. The rolls 387 are continuously driven from sprocket chain 391 which passes over sprocket wheel 390 by direct gear drive in housing 386, the details of which are not shown. Since the master belt 103a and the belts 103 are driven from the same power source used for rotating the rolls 387, the peripheral speed of the rolls 387 is caused to be the same as the speed of the rug margin as carried by belts 103 and 103a by proper selection of gear sizes in the drive mechanism. By the above described arrangement the solenoid 388 can be actuated to bring rolls 387 together and positively feed the reinforcement 385 through the guide tube 384. After the feed has been instituted, the reinforcement is held in the recess in the rug sufficiently tenaciously so that if actuation of the solenoid is discontinued and rolls 387 no longer grip the reinforcement 385, the reinforcement 385 will, nevertheless, be dragged by the rug margin and pulled from the reel 383 as long as continual supply of the reinforcing element to the slit in the rug margin is desired. Actuation of the solenoid 388 is dependent upon the closing of the circuit which comprises wires 392 and 393 and which will be described in detail hereinbelow.

The length of the reinforcement supplied by the reinforcement supply means is governed by the reinforcement cut off knife 394, the action of which is controlled by solenoid 395. The knife 394 normally is retracted but upon actuation of the solenoid 395 can be caused to cut the reinforcement to desired length. The solenoid 395 is included in a circuit comprising lines 396 and 396a which will be described in detail hereinbelow. However, at this point, it may be mentioned that the reinforcement is initially deposited in the recess of the rug margin at desired location relative to the leading edge of the rug passing through the machine, and is cut so that the other end of the reinforcement will be in desired location relative to the trailing edge of the rug. To prevent any back feed of the reinforcing element 385, through action of the spring guide 492, a pair of clutch rolls 397 is provided which squeeze the reinforcing element as it enters the housing 386 and which rotate only in a direction to permit forward movement of said reinforcing element.

Slit closing means

After the adhesive and reinforcing element have been deposited in the recess in the rug margin it is desirable to employ positive means for closing the slit or recess and preferably as well to provide the margin of the rug with a desired surface contour. For this purpose a plurality of slit closing mechanisms are employed, as shown in Figs. 1, 45, 46, 47 and 48. Each of these mechanisms consists essentially of a pair of rolls between which the margin of the rug passes which are carried by suitable support brackets 398, 399, 400, 401, 402 and 403 that are secured to frame 100 (Fig. 1). Brackets 398 and 399 carry rolls 404 and 405 having the contour shown in Fig. 47 (which is a sectional elevation of the device comprising bracket 398). Brackets 400, 401, 402 and 403 carry rolls 406 and 407 which have the contour shown in Fig. 48 (which is an elevation partly in section of the device comprising bracket 400). These devices are identical except for the contour of the rolls, and for this reason only one of the recess closing devices will be described in detail. Rolls having the contour of rolls 404 and 405 have for their primary function the closing and squeezing together of the slit, with the adhesive and reinforcing member embedded in the slit. Rolls having the contour of rolls 406 and 407 have the same function and complete the slit closing operation. In addition, the rolls 406 and 407 tend to bend the rug margin downwardly so that the margin of the rug will tend to lie snugly on the floor. It is not necessary, however, that the rolls 406 and 407 have the special contour shown.

The slit closing rolls are driven by the sprocket chain 205 which zigzags between the idler gears 408 and the sprocket gears 409 that are integral with the lower roll of each pair of rolls, e. g., roll 405 (Fig. 47), the roll 405 being rotatable about the stub shaft 410 carried by bracket 398. The upper roll 404 is rotatable about stub shaft 411 which is likewise carried by bracket 398 and is positively driven by the gear 412 which meshes with the gear 413 that is integral with the sprocket gear 409. The spacing of the rolls, e. g., rolls 404 and 405, can be adjusted as by carrying the shaft 411 in the eccentric bore bushing 414 which is rotatable in one direction or the other by threaded set screw 415. The drive of the rolls 404 and 405 as well as the rolls 406 and 407 is arranged so that the peripheral speed will be essentially the same as the rate of movement of the rug 140 as carried by the master belt 103a.

If desired cleaning knives can be used in connection with the slit closing rolls to scrape off any adhesive that may be picked up by the surface thereof. The knife blades 416 can be carried by pivoted rods 417 having arms 418 that have a tension spring 419 therebetween to urge the cleaning knives into scraping contact with the periphery of the recess closing rolls.

Trimming means

In order that the rug margin may have as uniform an edge as possible, it is preferably trimmed along the edge after the rug margin has been subjected to the rug margin operational mechanisms above described. Such trimming mechanism is shown in Figs. 1, 49, 50, 51, 52 and 53 and is carried by a bracket 420, the unit being movable as a whole by movement of plate 421 which is slidably carried on bracket 420 and which is adjustable in one direction or the other by turning the adjusting bolt 422 having a manually operatable handle 423, so that the trimming knives 424 and 425 of the mechanism will be effective in the desired position with reference to the margin of rug 140 as held between master belt 103a and the overlying belt 177. The trimming knives are power driven from motor 426 by means of the chain 427 which passes over sprocket wheel 428 that is fixed to the rotatable shaft 430 that carries knife 424 and which passes over sprocket wheel 429 that is fixed to the rotatable shaft 431 that carries knife 425. The motor 426 preferably drives the knives 424 and 425 so that the speed at the periphery thereof is somewhat less than the normal speed of the rug as carried by the master belt 103a, and the sprocket gear 432 carried by motor shaft 433 operates through a free wheeling clutch so that upon the leading edge of the rug coming in contact with the knives 424 and 425, the knives are free to rotate at an increased peripheral speed corresponding to the speed of the rug. In this manner the trimming knives are maintained in rotation to provide a peripheral speed somewhat less than that of the normal speed of the rug and are free to assume the peripheral speed of the rug when the rug margin is in operational relation thereto.

The trimming mechanism is provided with suitable adjustment means. For adjusting the chain 427, the sprocket wheel 434 is mounted for rotation on a stub shaft 435 carried by a block 436 that is slidable in either direction between guide plates 437 by adjusting bolt 438.

The bite of the trimming knives is adjusted by carrying the rotatable shaft 431 in a block 439 that is slidable vertically between plates 496 under the action of manually rotatable adjusting bolt 440 and that can be locked in place by the lock bolt 441 which clamps the block 439 between the bolt 441 and the stop 442.

Preferably the trimming knife 425 is urged outwardly on shaft 431 by compression spring 443 so that the cutting edge of knife 425 will be urged against the cutting edge of knife 424. It is also preferable to provide cleaning means for cleaning the knife 425 which cuts through the rug margin, and in the device shown, there is a container 444 which contains solvent that by wicking action supplies solvent to a mass of waste 445 or the like that is maintained in contact with the knife 425.

Discharge means

At the discharge end of the machine, the discharge of the rug from the machine is facilitated by an air blast. At the discharge end of the table 102 is a trough 447 (Fig. 55) in which is located a pipe 448 having a plurality of outlet orifices so that compressed air discharged from the orifices in the pipe 448 will serve to lift the rug 140 as it leaves the table 102 and thereby facilitate discharge of the rug from the machine. The line 448 is shown controlled by valve 449 which is actuated by solenoid 450 to open the valve upon energizing the circuit containing the wires 451 and 452 for discharge of the air blast at the desired time.

Electrical control means

The control for actuation or tripping of the different parts of the machine is effected by electrical circuit and switch mechanisms of conventional design which advantageously are arranged as shown in Fig. 56 and in the manner to be described. In Fig. 56, the operating mechanisms to be actuated have been shown schematically in relation to the table 102 upon which the rugs are carried in the direction of the arrow, namely, from right to left. The location of the different mechanisms to be actuated has been indicated only approximately due to the fact that some of these mechanisms which in the machine are very close together can be represented more clearly in Fig. 56 as somewhat spaced apart. The location of the switches with reference to the mechanism controlled thereby is indicated roughly. In Figs. 1, 1A and 56 the corresponding units to be actuated have been designated by letters as follows:

Pick-up rolls—P. R.
Caterpillar clamp—C. C.
Slitting unit—S.
Knife changing means of slitting unit—K.
Reinforcement supply unit:
  (a) Feed rolls—R. F.
  (b) Cut off—R. C.
Adhesive supply means—A. S.
Wiper over feed nozzle—W. F.
Wiper over spreader—W. S.
Air blast at discharge—A. D.

The switches for controlling the circuits are supported by suitable support means (not shown) over the path of the rug as the rug is carried through the machine and are adapted to be actuated by the leading and trailing edges of each rug as the rug is carried through the machine. Thus a switch which is normally open, is closed by the leading edge of the rug and is maintained closed during the passage of the rug thereby, the switch becoming open again as the trailing edge of the rug passes thereby. Conversely, if the switch is normally closed, it is opened by the leading edge of the rug and remains open until the trailing edge of the rug passes thereby. The switches have been indicated conventionally in Fig. 56 by circles, those switches which are normally open (preventing flow of current) being indicated with the small line within the circle perpendicular to the indicated wires on either side of the switch, and those switches which are normally closed (permitting flow of current) being indicated with the small line within the circle in the direction of the indicated wires on either side of the switch. The electric power is supplied by power lines 455 and 456 in either side of the table 102 from any suitable source of electric power (not shown).

Referring to the actuation of the different mechanisms, the pick-up rolls P. R. are actuated by air cylinder 147 whenever the circuit is completed to the solenoid valve 151 between power lines 455 and 456 through lines 152 and 152a, and, when actuated, press the rug as it is being introduced into the machine against the carrying belts 103 and 103a so as to pull the rug into the machine. The switch 457 is normally open and the switch 458 is normally closed. Therefore, as soon as the leading edge of the rug reaches the switch 457 the pick-up rolls are actuated. The switch 457 is ordinarily positioned so that the pick-up rolls will be actuated immediately after the leading edge of the rug comes under the pick-up rolls. When the leading edge of the rug reaches normally closed switch 458, this switch is opened, thus releasing the pick-up rolls so that they assume non-operative position. The switch 458 remains open until the trailing edge of the rug clears switch 458 even though the next succeeding rug has reached switch 457. The spacing between switches 457 and 458 is about 7 feet or more, so that the pick-up rolls will remain in operative position for introducing long rugs into the machine. The minimum rug length, however, is only about 6 feet and in order to bridge the space between switches 457 and 458 for proper handling of short rugs, one or more normally open switches 459 are employed and located between switches 457 and 458 so that the circuit will remain closed until the leading edge of the rug reaches switch 458. The distance between switches 457 and 458 also serves to space successive rugs a sufficient distance apart so that the trailing edge of one rug can clear the last clamping roller 153 and the rollers be elevated before the leading edge of the next rug passes beneath the first of the series of clamping rollers 153.

The rollers 153 of the caterpillar clamp C. C. are normally elevated but are actuatable to clamp the rug margin between the rollers 153 and the master belt 103a when the circuit comprising wires 176 and 176a is completed through the solenoid valve 175 by closing of the normally open switch 460 by the leading edge of the rug. At that time the rug margin has come into position under all the rollers 153. The caterpillar clamp remains in operative position until the trailing edge of the rug clears the switch 460 permitting it to resume its normal open position. In this manner, the rug margin while held in alignment by the rollers 153 of the caterpillar clamp is carried to the slitting unit, thereby insuring that the slitting will take place while the rug is in properly aligned position.

The reciprocating or oscillating action of the slitting unit S is controlled by normally open switch 462 and the normally closed switch 463. As soon as the leading edge of the rug reaches the switch 462, the circuit including wires 249 and 250 is closed, thereby actuating solenoid 237, and releasing the single turn clutch 235 (Figs. 24 and 25). Before the single turn clutch can make a complete revolution the leading edge of the rug opens the normally closed switch 463, thereby resetting the clutch. It is to be noted that the clutch 235 is released before the leading edge of the rug reaches the slitter unit. In other words, before the leading edge of the rug reaches the slitter unit, the slitter unit is caused to move in the same direction as the rug but at a lesser rate of travel so that the leading edge of the rug overtakes the slitter unit while the slitter unit is moving in the same direction as the rug, thereby permitting relatively rapid movement of the rug through the machine and thereby effecting initial contact of the leading edge of the rug with the knife while the speed of the rug relatively to the knife is considerably less than the speed of the rug relative to the frame of the machine. For example, the rug may be carried through the machine at a rate of 150 feet per minute while at the moment of initial contact of the knife with the leading edge of the rug, the speed of the rug relative to the knife may be as low as 40 feet per minute. Preferably the rug is initially contacted with the knife while the speed of the rug relative to the knife is not greater than about 60 feet per second.

After the rug margin has been slit by relative movement of the rug and slitting knife, the knife is changed, a clean knife being brought into operative position by the knife-changing mechanism K that has been described hereinabove. This mechanism is actuated by the closing of the circuit comprising lines 280 and 281 which circuit is controlled by switches 464 and 465. The normally closed switch 464 and the normally open switch 465 are positioned so that the circuit will become completed (causing the knife turret to change position) immediately after the trailing edge of the rug leaves the slitting knife. The leading edge of the rug first opens the switch 464 and closes switch 465. When the trailing edge of the rug reaches switch 464 this switch is closed completing the circuit and causing the knife-changing mechanism to operate. The circuit is again opened when the trailing edge of the rug clears switch 465.

The feed of wire or other reinforcing element 385 by reinforcement supply unit R. F. is initiated as described above by actuating solenoid 388 so as to bring together the constantly rotating feed rolls 387. This is accomplished by completing the circuit which comprises lines 392 and 393 and which is controlled by switches 466 and 467. As soon as the leading edge of the rug reaches normally open switch 466, this switch is closed, completing the circuit. The positive feed of the wire is continued until the leading edge of the rug reaches normally closed switch 467 and the opening of this switch causes the feed rolls 387 to separate. By the time the leading edge of the rug reaches switch 467, the wire will have become established in the recess in the margin of the rug and brought between the slit closing rolls, with the result that continued movement of the rug relative to the reinforcement supply means will continue to withdraw the wire and cause it to be deposited in the recess in the rug margin. The trailing edge of the rug opens switch 466 and closes switch 467 to place them in readiness for the next following rug. It may be noted that the switch 466 is positioned so that the feed of the wire is initiated before the rug reaches the point where the wire is inserted in the rug margin, thereby allowing for the travel of wire to this point from the cut-off knife 394 through the guide to 384.

The solenoid 395 actuates the cut-off knife 394 (R. C.) when the circuit containing wires 396 and 396a and controlled by switches 468 and 469 is completed. The leading edge of the rug opens normally closed switch 468 and closes normally open switch 469, thereby setting these switches so that when the trailing edge of the rug clears switch 468, the circuit is completed and the cut-off knife is actuated. The trailing edge of the rug restores switch 469 to normal open position. The switch 469 is spaced from switch 468 by a distance that is slightly less than the shortest goods to be handled. For example, when the shortest goods to be handled is about 6 feet, the switch 469 is spaced from switch 468 by a distance of about 5½ feet. The switch 468 is ordinarily positioned so that the reinforcing element will be cut off and the cut-off end drawn into the recess in the rug margin before the trailing edge of the rug clears the point where the reinforcing element is deposited in the rug margin.

As a safety factor, the line 392 includes normally closed relay switch 470 which is opened when current in line 396—396a actuates solenoid 471. Conversely, normally closed relay switch 472 is opened when current in line 392—393 actuates solenoid 473. By this arrangement, when the wire is being positively fed by the feed rolls the cut-off knife cannot be actuated. Conversely, when the cut-off knife is actuated to cut-off position, the feed rolls cannot be brought together to cause positive feed of the reinforcing element.

The supply of adhesive from the adhesive supply A. S. is started when the circuit containing lines 350 and 351 is completed. The switches 474 and 475 are both normally open, and the adhesive supply is not initiated until the leading edge of the rug passes both switches. The adhesive feed is cut off as soon as the trailing edge of the rug passes switch 474. The distance between switches 474 and 475 determines the distance along the rug margin ahead of the trailing edge of the rug that the adhesive supply is cut off.

The wiper W. F. which operates over the adhesive feed supply nozzle, is brought down to wiping position by the closing of the mechanical switch 367 in line 369 to complete the circuit consisting of lines 368, 369 and 370. As described above in connection with Figs. 33 and 42, switch 367 is closed only when the switches 474 and 475 for the adhesive supply are closed so as to complete the circuit consisting of lines 350 and 351 and cause supply of adhesive.

The wiper W. S. which operates over the spreader 353, is actuated from the rug upon the leading edge of the rug closing both of normally open switches 476 and 477 in circuit 372—372a. The wiper is retracted again to non-operative position as soon as the trailing edge of the rug clears the switch 476, thus opening the circuit again. The distance between the switches 476 and 477 determines the distance along the rug margin prior to the trailing edge of the rug that it is desirable to have the wiper W. S. retracted. It is ordinarily desirable to have the wiper W. S. retracted just prior to the trailing edge of the rug reaching it so that the wiper will not contact the spreader 353 and become soiled.

The release of air A. D. at the discharge end of the machine is controlled by switches 478 and 479 which are normally open in the circuit containing wires 451—452 and solenoid 450. The air is not released until the leading edge of the rug completes the circuit by closing both switches 478 and 479. The air continues to be released and facilitates handling and piling at the discharge end of the machine until the trailing edge of the rug clears switch 478 and opens the circuit again.

While this invention has been described in detail in connection with a specific embodiment thereof, it is to be understood that this has been done for illustrative purposes only. It is apparent that many of the details of construction can be varied and that equivalent mechanisms substituted for the particular mechanisms shown. Thus while the rug margin operational mechanisms are shown as fixed to a stationary frame and the rug as carried with rug margin in operative relation thereto, one can, if desired, maintain the rug stationary and move the rug margin operational mechanisms relative to the rug margin. Moreover, it is not essential that all of the described mechanisms be employed in a single machine, but it is preferred that the mechanisms be employed in the combination shown and described. If desired, certain of the mechanisms may be omitted such as the trimming mechanism, the wiper mechanism, etc., without departing from the invention herein described. In the following claims the machine is referred to as apparatus for acting upon, e. g., reinforcing, the margin of a flexible smooth surface rug or the like, but it is to be understood that the apparatus as thus claimed covers apparatus for acting upon other sheet materials as well as flexible smooth surface rugs when such apparatus falls within the language of the following claims.

I claim:

1. A machine for reinforcing a marginal portion of a flexible smooth surface rug or the like with an elongated reinforcing element extending along said marginal portion of said rug, which machine comprises slitting means adapted to slit said rug to form a slit extending laterally inwardly adjacent said margin thereof, reinforcement supply means adapted to dispose an elongated reinforcing element in the slit produced by said slitting means, aligning means for aligning said rug for operative engagement with said slitting means and with said reinforcement supply means, and means for effecting relative movement of said rug as aligned by said aligning means with respect to said slitting means and said reinforcement supply means, said aligning means comprising stop means arranged for abutting the edge of said rug at said marginal portion thereof, means for urging said rug against said stop means for aligning the margin of said rug, and holding means arranged to hold said rug in position with said edge of said rug abutting said stop means while permitting movement of said rug relative to said slitting means and said reinforcement supply means.

2. A machine for reinforcing the marginal portion of a flexible smooth surface rug or the like which machine comprises rug margin operational mechanisms including slitting means adapted to slit said rug to form a slit extending laterally inwardly adjacent said margin of said rug, adhesive supply means adapted to deposit adhesive in the slit produced by said slitting means, reinforcement supply means adapted to deposit an elongated reinforcing element in the slit produced by said slitting means, and slit-closing means adapted to press together the inner surfaces of said slit, said rug margin operational mechanisms being arranged in alignment for sequentially acting upon said margin of said rug, and which machine comprises carrying means for carrying said rug in alignment with said rug margin operational mechanism to be acted upon thereby, said carrying means comprising movable support means underlying said rug including said margin thereof and pressure-applying means disposed over said rug including said margin thereof adapted to press said margin of said rug between said pressure-applying means and said movable support, said pressure-applying means presenting for contact with the upper surface of said rug a surface that is movable with said rug upon movement of said rug by said movable support means.

3. A machine for reinforcing the marginal portion of a flexible smooth surface rug or the like which comprises rug margin operational mechanisms including slitting means adapted to slit said rug laterally inwardly adjacent a margin of said rug, adhesive supply means adapted to deposit adhesive in the slit produced by said slitting means, reinforcement supply means adapted to deposit an elongated reinforcing element in the slit produced by said slitting means, slit closing means adapted to press together the inner surfaces of said slit, and trimming means adapted to trim the edge portion of said rug, said rug margin operational mechanisms being arranged in alignment for sequentially acting upon the margin of said rug, and aligning and carrying means adapted to align said rug with a margin thereof in alignment with said rug margin operational mechanisms and to carry said margin of said rug thereby to be acted upon by said mechanisms, said aligning and carrying means comprising a stop member in advance of said rug margin operational mechanisms and in alignment therewith and adapted to abut the edge of said rug at said margin of said rug, movable support means adapted to support said rug including said margin thereof and movable therewith to move said margin of said rug relative to said stop member and said rug margin operational mechanisms, means for urging said rug edge against said stop member to effect alignment of said rug edge therewith, and holding means adapted to hold said rug adjacent said margin thereof, said holding means including a depressible clamp presenting surface movable with said rug and adapted to impose pressure on the upper surface of said rug including said margin of said rug to press said rug margin between said surface of said depressible clamp and said support means to hold said rug in position as aligned by said aligning means, and said holding means including a movable guide sequentially arranged with respect to said clamp and presenting a surface overlying said rug and movable therewith to guide said margin of said rug between said movable support and said surface of said guide means during relative movement of said margin of said rug with respect to said rug margin operational mechanisms.

4. A machine for slitting the marginal portion of a flexible smooth surface rug or the like which comprises slitting means adapted to slit said rug adjacent the margin thereof and carrying and aligning means arranged to carry said margin of said rug in operational alignment with said slitting means, said carrying and aligning means comprising first movable belt means underlying and supporting said rug and arranged for moving said rug with said margin thereof at a predetermined proximity to said slitting means, second movable belt means underlying said rug and movable in a direction adapted to urge said margin of said rug toward said slitting means, and stop means against which said margin of said rug is caused to abut by said second belt means and which is disposed for aligning said margin of said rug for passage of said margin of said rug past said slitting means at said predetermined proximity thereto.

5. A machine according to claim 4 wherein said stop means includes a movable belt presenting a vertical face for abutting said margin of said rug, and means for moving said belt in the direction of movement of said rug effected by said first belt means during the portion of the travel thereof in contact with said rug.

6. A machine for slitting the marginal portion of a flexible smooth surface rug or the like which comprises slitting means adapted to slit said rug adjacent the margin thereof and movable support means arranged to carry said margin of said rug past said slitting means to be acted upon thereby, aligning means adapted to align said rug on said movable support means for passage of said margin of said rug past said slitting means at a predetermined proximity thereto, and depressible clamping means adapted to clamp said rug between said clamping means and said movable support means to maintain said margin of said rug in aligned position during passage of said margin of said rug in operational relationship with said slitting means.

7. A machine according to claim 6 wherein said depressible clamping means comprises a plurality of rollers, roller carrying means for rotationally carrying said rollers including means for resiliently urging said rollers downwardly, and means for elevating and lowering said roller carrying means.

8. In a machine for acting upon the marginal portion of a flexible smooth surface rug or the like, rug carrying and aligning means which comprises movable support means underlying said rug, elongated stop means arranged to abut an edge of said rug carried by said support means, means for urging said rug toward said elongated stop means to bring said rug edge in alignment therewith and depressible clamp means disposed over said rug and adapted to clamp the marginal portion of the rug adjacent said rug edge between a surface presented by said clamp means and said movable support means, said surface being movable with said rug upon movement of said rug by said movable support means.

9. A machine for reinforcing the marginal portion of a flexible smooth surface rug or the like which includes rug margin operational mechanisms including slitting means adapted to slit said rug adjacent the margin thereof, adhesive supply means adapted to deposit adhesive material in the slit produced by said slitting means, and reinforcement supply means adapted to deposit an elongated reinforcing element in the slit produced by said slitting means, means for effecting relative movement between the margin of said rug and said rug margin operational mechanisms with said margin of said rug in operational relation to said rug operational mechanisms, and actuating means for actuating said rug margin operational mechanisms including tripping means actuation of which is governed by the relative position of said rug with respect to said rug margin operational mechanisms.

10. A machine for reinforcing the marginal portion of a flexible smooth surface rug or the like which comprises rug margin operational mechanisms including slitting means adapted to slit said rug adjacent said margin thereof, adhesive supply means adapted to deposit adhesive in the slit produced by said slitting means, and reinforcement supply means adapted to deposit an elongated reinforcing element in the slit produced by said slitting means, said rug margin operational mechanisms being disposed in alignment for sequentially acting upon said margin of said rug, means for causing relative movement between said rug margin and said rug margin operational mechanisms, holding means actuatable to hold said rug margin in position to be acted upon by said rug margin operational mechanisms, means for actuating said rug margin operational mechanisms and said holding means including tripping means actuation of which is governed by the position of said rug relative to said rug margin operational mechanisms and to said holding means.

11. A machine for reinforcing the marginal portion of a flexible smooth surface rug or the like which comprises rug margin operational mechanisms including slitting means adapted to slit said rug adjacent the margin thereof, adhesive supply means adapted to deposit adhesive in the slit produced by said slitting means, reinforcement supply means adapted to deposit an elongated reinforcing element in said slit produced by said slitting means, slit closing means adapted to press together the inner surfaces of said slit, and trimming means adapted to trim said margin of said rug, said rug margin operational devices being arranged in alignment for sequentially acting upon said margin of said rug, aligning means adapted to bring said margin of said rug in alignment with said rug margin operational mechanisms, means for carrying said rug past said rug margin operational mechanisms with the marginal portion in alignment with said mechanisms to be acted upon thereby, holding means actuatable to hold said rug in alignment as aligned by said aligning means during carriage thereof by said carrying means, and actuating means for actuating said slitting means, said adhesive supply means, said reinforcement supply means, and said holding means, said actuating means including electrical circuit tripping means actuation of which is governed by the relative position of said rug with respect to said slitting means, said adhesive supply means, said reinforcement supply means, and said holding means respectively.

12. A machine for reinforcing the marginal portion of a flexible smooth surface rug or the like which comprises rug margin operational mechanisms including slitting means adapted to slit said rug laterally inwardly adjacent the margin thereof and movably mounted for movement in the direction of movement of said rug so that the relative speed of said slitting means to said rug is reduced at the moment of initiation of the slitting effected by said slitting means, adhesive supply means adapted to deposit adhesive in the slit produced by said slitting means, reinforcement supply means adapted to deposit an elongated reinforcing element in said slit produced by said slitting means, slit closing means adapted to press together the inner surface of said slit, and trimming means adapted to trim said margin of said rug, said rug margin operational mechanisms being arranged in alignment for sequentially acting upon said margin of said rug, movable support means arranged to carry said rug past said rug margin operational mechanisms with the margin thereof in alignment with said rug margin operational mechanisms, an elongated aligning member aligned with and in advance of said rug margin operational mechanisms adapted to abut the edge of said rug at said margin of said rug and movable with said rug, means for urging said rug toward said elongated aligning member to effect alignment of said edge of said rug therewith, clamping means disposed above said margin of said rug proximate to said elongated aligning member presenting a surface that is movable with said rug in the direction of movement of said rug and is depressible to clamp said margin of said rug as aligned with said elongated aligning member between said surface presented by said clamping means and said movable support means, pick-up rolls overlying said movable support means and depressible to press a leading portion of said rug against said movable support means to effect movement of said rug with said movable support means, means for moving said slitting means in the direction of movement of said rug during initiation of the slitting effected by said slitting means, and actuating means for respectively actuating said pick-up rolls, said clamping means, said means for moving said slitting means, said adhesive supply means, and said reinforcement supply means, said actuating means including electrical circuit means controlled by switch means that are operated responsive to movement of said rug relative to said respective means actuatable by said actuating means.

13. A machine for reinforcing the marginal portion of a flexible smooth surface rug or the like which comprises rug margin operational mechanisms including slitting means adapted to slit said rug laterally inwardly adjacent a margin of said rug and reinforcement supply means adapted to deposit an elongated reinforcing element in said slit, said rug margin operational mechanisms being arranged in alignment for acting upon said margin of said rug, holding means for holding said margin of said rug in alignment with said rug margin operational mechanisms including means to prevent lateral movement of said rug toward or away from said rug margin operational mechanisms, and means for effecting relative movement of said margin of said rug relative to said rug margin operational mechanisms in the direction of the alignment of said mechanisms and in operative relation to said mechanisms, said last named means including means for effecting relative movement between said slitting means and said margin of said rug which is substantially less rapid at the initiation of the slitting effected by said slitting means than subsequently during said slitting.

14. A machine for reinforcing the marginal portion of a flexible smooth surface rug or the like which comprises rug margin operational mechanisms including slitting means adapted to slit said rug laterally inwardly adjacent a margin of said rug, adhesive supply means adapted to deposit adhesive in said slit, and reinforcement supply means adapted to deposit an elongated reinforcing element in said slit, said rug marginal mechanisms being arranged in alignment for acting upon said margin of said rug and the position of said adhesive supply means and said reinforcement supply means being fixed, carrying means adapted to carry said margin of said rug past said rug margin operational mechanisms in alignment therewith to be acted upon thereby, and means for causing travel of said slitting means in the direction of movement of the margin of said rug carried by said carrying means at the moment of initiation of the slitting of said rug margin by said slitting means and for causing subsequent return travel of said slitting means.

15. A machine according to claim 14 wherein said slitting means includes a knife for slitting said margin of said rug and wherein there is extensible guide means between said knife of said slitting means and said adhesive supply means adapted to maintain the slit produced by said knife in opened-up condition with the opposed surfaces of said slit spaced apart.

16. A machine for slitting a marginal portion of a flexible smooth surface rug or the like which comprises a slitting tool adapted to cut a slit in the margin of the rug and means for effecting relative movement between said slitting tool and the margin of the rug with said rug margin maintained in operative relation to said slitting tool at a relative speed which at the moment of initiation of the slitting stroke is substantially slower than the speed of the rug margin relative to the slitting tool that is subsequently attained during the cutting stroke.

17. A machine according to claim 16 which comprises guide rolls adjacent said slitting tool arranged for passage of the rug margin therebetween with the slitting tool in operative relation to the rug margin and means for positively driving said guide rolls at a peripheral speed corresponding to the linear speed of said rug margin relative to said slitting tool for the different speeds of said rug margin relative to said slitting tool occurring during the slitting stroke.

18. A machine for slitting a marginal portion of a flexible smooth surface rug or the like which comprises a slitting tool adapted to cut a slit in the marginal portion of a rug, means for carrying the marginal portion of said rug past said slitting tool in operative relation thereto, and means for moving said slitting tool first in the direction of movement of the rug margin as carried by said carrying means at the moment of initiation of the slitting stroke of said slitting tool and subsequently in the opposite direction during the continuation of the slitting stroke of the tool.

19. A machine for slitting the marginal portion of a flexible smooth surface rug or the like which comprises a slitting tool adapted to cut a slit in the margin of said rug, rug carrying means adapted to carry the margin of the rug in operative relation to said slitting tool, means for moving said slitting tool in the direction of movement of said rug margin as carried by said carrying means at the moment of initiation of the slitting stroke and for return of the slitting tool to original position with increase in speed of the slitting tool relative to the rug margin during the balance of the cutting stroke, guide rolls adjacent said slitting tool in fixed position relative thereto and arranged for passage of said rug margin therebetween in operative relation to said slitting tool, and means for positively driving said guide rolls at a peripheral speed corresponding to the linear speed of said rug margin as carried by said carrying means past said slitting tool in operative relation thereto.

20. A machine for slitting the marginal portion of a flexible smooth surface rug or the like which comprises a slitting tool adapted to cut a slit in the margin of said rug, rug carrying means adapted to carry a margin of the rug in operative relation relative to said slitting tool, reciprocating means for reciprocating said slitting tool in alignment with the margin of said rug as carried by said carrying means from starting position through one complete cycle in the direction of movement of the rug as carried by said carrying means and back again to said starting position, means for maintaining said reciprocating means with said cutting tool normally at rest in said starting position, and tripping means for releasing said reciprocating means to effect said cycle of said reciprocating means upon approach of the leading edge of a rug as carried by said carrying means to the normal rest position of said slitting tool.

21. A machine for slitting the marginal portion of a flexible smooth surface rug or the like which comprises a slitting tool adapted to form a slit in said rug adjacent the margin thereof, carrying means for carrying said rug relatively to said slitting tool with the margin of said rug in operative relation to said slitting tool for the formation of a slit in said margin of said rug, said carrying means presenting a movable support for said rug adjacent the margin thereof, and clamping means disposed above said movable support and presenting a plurality of rollers for clamping said margin of said rug between said rollers and said movable support, said clamping means being positioned for clamping said margin of said rug as said margin of said rug is brought into operative relation with said slitting tool by said movable support.

22. A machine for slitting the marginal portion of a flexible smooth surface rug or the like which comprises slitting means adapted to slit said rug to form a slit adjacent the margin thereof and means for effecting relative movement between the margin of said rug and said slitting means with the margin of said rug maintained in operative relation with said slitting means, said slitting means comprising a plurality of slitting tools, means adapted to successively move one of said slitting tools into operative position for slitting said rug adjacent the margin thereof upon effecting relative movement between the margin of said rug and said slitting means and to maintain said slitting tool in said operative position, and cleaning means for cleaning said slitting tools when out of said operative position and prior to movement thereof into said operative position.

23. A machine for slitting the marginal portion of a flexible smooth surface rug or the like which comprises slitting means adapted to slit said rug to form a recess adjacent the margin thereof and means for effecting relative movement between the margin of said rug and said slitting means with the margin of said rug maintained in operative relation with said slitting means, said slitting means comprising a plurality of knives, a rotatable holder for said knives, stop means for maintaining said holder in position for maintaining one of said knives in operative position for slitting a recess in the margin of said rug upon effecting relative movement between said margin of said rug and said slitting means, and means for rotating said holder upon completion of a slitting stroke to bring another knife held by said holder into said operative position.

24. A machine of the character described including means for slitting a flexible smooth surface rug adjacent a margin thereof to form a slit therein and adhesive supply means for depositing adhesive in said recess, said adhesive supply means including a nozzle adapted to inject adhesive into said recess, means for effecting relative movement between said nozzle and the margin of said rug to distribute adhesive within said recess, an adhesive reservoir, means for circulating a stream of adhesive from said reservoir to a point adjacent said nozzle and back to said reservoir, and valve means for controlling diversion of said adhesive from said stream through said nozzle into said recess.

25. A machine according to claim 24 wherein said valve means is actuated by tripping means operative from the leading and trailing edges of the rug upon effecting relative movement between said rug and said adhesive supply means with said nozzle in operative relation with the slit in the margin of said rug.

26. A machine of the character described including adhesive supply means for supplying adhesive to a slit in the margin of a flexible smooth surface rug or the like, said machine comprising an adhesive reservoir, a nozzle, means for forcing adhesive from said reservoir through said nozzle, means for effecting relative movement between the margin of the flexible smooth surface rug and said nozzle with said nozzle inserted in said slit, and wiping means for wiping an exterior surface of said rug, said wiping means being arranged to press an inner surface of said slit against said nozzle upon effecting relative movement as aforesaid between said margin of said rug and said nozzle.

27. A machine of the character described including adhesive supply means for supplying adhesive to a slit in the margin of a flexible smooth surface rug, said machine comprising an adhesive reservoir, a nozzle, feed means for forcing adhesive from said reservoir through said nozzle, valve means for controlling the adhesive supplied to said nozzle by said feed means, means for effecting relative movement between the margin of the flexible smooth surface rug and said nozzle, with said nozzle inserted in said slit, and wiping means, said wiping means including a wiping member for contacting the exterior surface of said smooth surface rug and arranged for pressing an inner surface of said slit against said nozzle upon effecting relative movement as aforesaid between said margin of said rug and said nozzle and including means for moving said wiper member into and out of wiping position in timed relation to operation of said valve means for initiating and cutting off discharge of adhesive through said nozzle.

28. A machine of the character described including means for slitting a flexible smooth surface rug adjacent a margin thereof to form a slit, means for spacing apart the inner surfaces of said slit, and adhesive supply means for delivering adhesive into said slit, said adhesive supply means comprising a nozzle, feed means for discharging adhesive through said nozzle, valve means for controlling discharge of adhesive through said nozzle, means for actuating said valve means to institute and cut off flow of adhesive through said nozzle means, and means associated with said nozzle for withdrawing adhesive from said nozzle upon actuation of said valve means to cut off discharge of adhesive through said nozzle.

29. A machine of the character described including means for slitting a flexible smooth surface rug adjacent a margin thereof to form a slit, means for spacing apart the inner surfaces of said slit, and adhesive supply means for delivering adhesive into said slit, said adhesive supply means comprising a nozzle, feed means for discharging adhesive through said nozzle, valve means for controlling discharge of adhesive through said nozzle, means for actuating said valve to institute and cut off flow of adhesive through said nozzle, and auxiliary feed means associated with said nozzle for injecting adhesive into said nozzle upon actuation of said valve means to initiate discharge of adhesive through said valve means and from said nozzle to augment the normal supply of adhesive supplied to said nozzle by said feed means through said valve means.

30. A machine of the character described including means for slitting a flexible smooth surface rug adjacent a margin thereof to form a slit, means for spacing apart the inner surfaces of said slit, and adhesive supply means for delivering adhesive into said slit, said adhesive supply means comprising a nozzle, feed means for discharging adhesive through said nozzle, valve means for controlling discharge of adhesive through said nozzle, said nozzle being provided with a passage between said valve means and the mouth of said nozzle, a plunger slidable in a bore in communication with said passage, means for retracting said plunger upon actuation of said valve means to cut off position thereby withdrawing adhesive from said passage, and means for advancing said plunger to inject adhesive from said bore into said passage upon actuation of said valve means from cut off position to open position.

31. A machine of the character described including reinforcement supply means adapted to deposit an elongated reinforcement in a slit adjacent the margin of a flexible smooth surface rug or the like, said reinforcement supply means comprising a source for supplying said reinforcing element, guide means for guiding said reinforcing element from said source and depositing it in said slit, and feed means for moving said reinforcing element from said source to said slit through said guide means, said feed means including a releasable positive drive for said reinforcing element and means for rendering said positive drive inoperative for continued supply of said reinforcing element drawn from said source by the portion of said reinforcing element previously moved into and established in said slit, and means for effecting relative movement between the margin of said rug and said guide means with said guide means disposed for depositing said reinforcing element in said slit.

32. A machine according to claim 31 including pressure rolls adapted to press the faces of said slit together with said reinforcement therebetween, said pressure rolls being adjacent said portion of said guide means for depositing said reinforcement on said slit and being arranged for gripping said reinforcement after said reinforcement has been deposited in said slit.

33. A machine according to claim 31 which comprises cutting means for cutting said reinforcing element, and tripping means operative upon movement of said rug margin relative to said reinforcement supply means for successively actuating said drive means to operative position for positively feeding said reinforcing element, for releasing said drive means to inoperative position, and for actuating said cutting means to cut said reinforcing element.

34. A machine of the character described including reinforcement supply means adapted to deposit an elongated reinforcing element in a slit adjacent the margin of a flexible smooth surface rug or the like and means for carrying said rug past said reinforcement supply means in operative relation thereto for depositing said reinforcing element in said slit, said carrying means including a belt and a source of power for operating said belt, and said reinforcement supply means including feed rolls driven from said power source at a peripheral speed substantially the same as the speed of said belt.

35. A machine according to claim 34 wherein said feed rolls are rotated constantly in normally spaced apart position without gripping said reinforcement, and which comprises means for moving a least one of said rolls into and out of position to grip said reinforcement between said rolls for positively feeding said reinforcing element.

36. A machine for reinforcing a marginal portion of a flexible smooth surface rug or the like which includes rug margin operational mechanisms comprising slitting means adapted to slit said rug adjacent a margin thereof, reinforcement supply means adapted to deposit an elongated reinforcing element in said slit, means for effecting relative movement between said rug margin operational mechanisms and said rug with the margin of said rug in operative relation with respect to said mechanisms, slit closing rolls adapted to press the inner surfaces of said slit together with said reinforcing element therebetween, and means for positively actuating said slit closing rolls at a peripheral speed substantially that of the linear speed of said rug margin relative to said rug margin operational mechanisms.

37. A machine for reinforcing a marginal portion of a flexible smooth surface rug or the like which comprises rug margin operational mechanisms including slitting means adapted to slit said rug adjacent a margin thereof, reinforcement supply means adapted to deposit an elongated reinforcing element in said slit and slit closing rolls adapted to press the inner surfaces of said slit together with said reinforcement therebetween, and said machine comprising carrying means including a belt adapted to carry said rug with the margin of said rug in operative relation with respect to said rug margin operational devices, power means for moving said belt, and means for positively rotating said slit closing rolls by direct drive from said power means at a peripheral speed which is substantially the same as the linear speed of said belt.

38. A machine for reinforcing the marginal portion of a flexible smooth surface rug or the like which includes rug margin operational mechanisms including slitting means adapted to slit said rug adjacent a margin thereof and reinforcement supply means adapted to deposit an elongated reinforcing element in said slit, and trimming means for trimming the margin of said rug, and said machine including means for effecting relative movement between said rug and said rug margin operational mechanisms with the margin of said rug in operative relation with respect to said mechanisms, said trimming means comprising a pair of rotary trimming knives, and drive means for rotating said trimming knives, said drive means including a clutch adapted to permit rotation of said knives induced by relative movement of said rug margin in operational engagement with said knives, at a speed of rotation that is greater than the normal speed of rotation of said knives as rotated by said drive means.

39. A machine for reinforcing the marginal portion of a flexible smooth surface rug or the like which includes rug margin operational mechanisms including slitting means adapted to slit said rug adjacent a margin thereof, reinforcement supply means adapted to deposit an elongated reinforcing element in said slit, and trimming means for trimming the margin of said rug, and said machine including means for effecting relative movement between said rug and said rug margin operational mechanisms with the margin of said rug in operative relation with respect to said mechanisms, said trimming means comprising rotary knives, and cleaning means associated with said knives.

40. A machine for reinforcing a marginal portion of a flexible smooth surface rug or the like which includes rug margin operational mechanisms including slitting means adapted to slit said rug adjacent a margin thereof and reinforcement supply means adapted to deposit an elongated reinforcing element in said slit, and said machine comprising a table support for said rug, means for carrying said rug along said table support with the margin of said rug in operative relation with said rug margin operational mechanisms, and air blast means adapted to direct an air blast underneath said rug adjacent the discharge end of said machine where said rug leaves said table support.

41. A machine for reinforcing a marginal portion of a flexible smooth surface rug or the like which comprises rug margin operational mechanisms including slitting means adapted to slit a margin of said rug adjacent a margin thereof and reinforcement supply means adapted to deposit an elongated reinforcing element in said slit, and said machine comprising carrying belts for carrying said rug with the margin of said rug in operative relation with said rug margin operational mechanisms, pick-up rolls disposed over said belts, means for maintaining said pick-up rolls normally out of contact with said belts, and means for depressing said pick-up rolls for drawing the leading portion of a rug between said belts and said pick-up rolls onto said belts.

42. A machine according to claim 41 wherein said pick-up rolls are depressible by tripping means operative from the leading edge of said rug as the leading edge of said rug is brought between said tripping rolls and said belts.

43. A machine according to claim 41 which includes means for rendering inoperative said means for depressing said pick-up rolls until the trailing edge of the rug has passed a predetermined distance as carried by said belts beyond said pick-up rolls.

44. In a machine for acting upon the marginal portion of a flexible smooth surface rug or the like, rug carrying and aligning means which comprises, a table support, first belt means movable along the upper surface of said table support and adapted to carry a flexible smooth surface rug thereon and along said table support, a vertical aligning belt disposed in alignment with said first belt means, and second belt means movable along the upper surface of said table support at an angle with respect to said first belt means and adapted to urge a margin of a rug carried by said first belt means against said vertical aligning belt to maintain said rug in desired aligned position with said vertical aligning belt as carried by said first belt means.

45. In a machine according to claim 44, drive means for said first and second belt means and for said vertical aligning belt having common control for actuation of said first and second belt means and said vertical aligning belt at substantially the same linear speed.

GEORGE A. G. BEERLI.